(12) United States Patent
Kato et al.

(10) Patent No.: US 12,519,138 B2
(45) Date of Patent: Jan. 6, 2026

(54) SOLID-STATE BATTERY

(71) Applicant: Murata Manufacturing Co., Ltd., Nagaokakyo (JP)

(72) Inventors: Tomohiro Kato, Nagaokayo (JP); Takayuki Nagano, Nagaokakyo (JP); Akira Baba, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 772 days.

(21) Appl. No.: 17/847,323

(22) Filed: Jun. 23, 2022

(65) Prior Publication Data

US 2022/0328882 A1 Oct. 13, 2022

Related U.S. Application Data

(63) Continuation of application No. PCT/JP2020/048537, filed on Dec. 24, 2020.

(30) Foreign Application Priority Data

Dec. 27, 2019 (JP) ................. 2019-238870

(51) Int. Cl.
*H01M 10/0585* (2010.01)
*H01M 10/0525* (2010.01)
*H01M 50/531* (2021.01)

(52) U.S. Cl.
CPC ... *H01M 10/0585* (2013.01); *H01M 10/0525* (2013.01); *H01M 50/531* (2021.01)

(58) Field of Classification Search
CPC ............ H01M 50/531; H01M 50/124; H01M 50/1243; H01M 50/1245; H01M 50/126;
(Continued)

(56) References Cited

U.S. PATENT DOCUMENTS 5,561,004 A * 10/1996 Bates ............... H01M 50/119
429/185
2004/0185336 A1* 9/2004 Ito ................... H01M 10/0562
429/162
(Continued)

FOREIGN PATENT DOCUMENTS

JP 2010140725 A 6/2010
JP 2015220099 A 12/2015
(Continued)

OTHER PUBLICATIONS

O. Ikeda, Y. Watanabe and F. Itoh, "Corrosion Measurement of a Conductive Paste and Anisotropic Conductive Adhesive Films," Polytronic 2007—6th International Conference on Polymers and Adhesives in Microelectronics and Photonics, Tokyo, Japan, pp. 77-80 (Year: 2007).*
(Continued)

*Primary Examiner* — Marla D Mcconnell
*Assistant Examiner* — Julia S Caserto
(74) *Attorney, Agent, or Firm* — ArentFox Schiff LLP

(57) ABSTRACT

A solid-state battery that includes: a solid-state battery main portion having a positive electrode layer and a negative electrode layer alternatively stacked with a solid electrolyte layer interposed therebetween; a first end surface electrode electrically connected to the positive electrode layer and disposed on a first side surface of the solid-state battery main portion; a second end surface electrode electrically connected to the negative electrode layer and disposed on a second side surface of the solid-state battery main portion; a first lower surface electrode electrically connected to the first end surface electrode and disposed on a lower surface side of the solid-state battery main portion; and a second lower surface electrode electrically connected to the second
(Continued)

end surface electrode and disposed on the lower surface side of the solid-state battery main portion.

19 Claims, 23 Drawing Sheets

(58) Field of Classification Search
CPC .. H01M 50/131; H01M 50/14; H01M 50/141; H01M 50/522; H01M 50/52
USPC .......................................... 429/152, 160, 162
See application file for complete search history.

(56) References Cited

U.S. PATENT DOCUMENTS

| | | | | |
|---|---|---|---|---|
| 2007/0015060 | A1* | 1/2007 | Klaassen | H01M 10/056 429/126 |
| 2008/0311480 | A1* | 12/2008 | Sano | B32B 37/24 156/281 |
| 2009/0181303 | A1* | 7/2009 | Neudecker | H01M 4/382 252/500 |
| 2009/0214899 | A1* | 8/2009 | Shakespeare | H01M 10/0436 429/162 |
| 2010/0291431 | A1* | 11/2010 | Shih | H01M 6/40 29/623.2 |
| 2012/0015234 | A1 | 1/2012 | Iwaya et al. | |
| 2017/0250393 | A1 | 8/2017 | Watanabe et al. | |
| 2017/0256816 | A1 | 9/2017 | Watanabe et al. | |
| 2019/0245247 | A1* | 8/2019 | Libsch | H01M 4/525 |
| 2020/0358133 | A1 | 11/2020 | Baba et al. | |
| 2020/0381775 | A1 | 12/2020 | Fujii et al. | |

FOREIGN PATENT DOCUMENTS

| | | | |
|---|---|---|---|
| JP | 2017152247 A | 8/2017 | |
| JP | 2017157447 A | 9/2017 | |
| JP | 2019145486 A | 8/2019 | |
| WO | WO-2019167856 A1 * | 9/2019 | ........ H01M 10/0525 |

OTHER PUBLICATIONS

Pralong, V. "Lithium intercalation into transition metal oxides: A route to generate new ordered rock salt type structure". Progress in Solid State Chemistry, 37, 262-277 (Year: 2009).*
English Translation of WO2019167856A1.*
International Search Report in PCT/JP2020/048537, mailed Mar. 2, 2021, 3 pages.

* cited by examiner

FIG. 8 - PRIOR ART
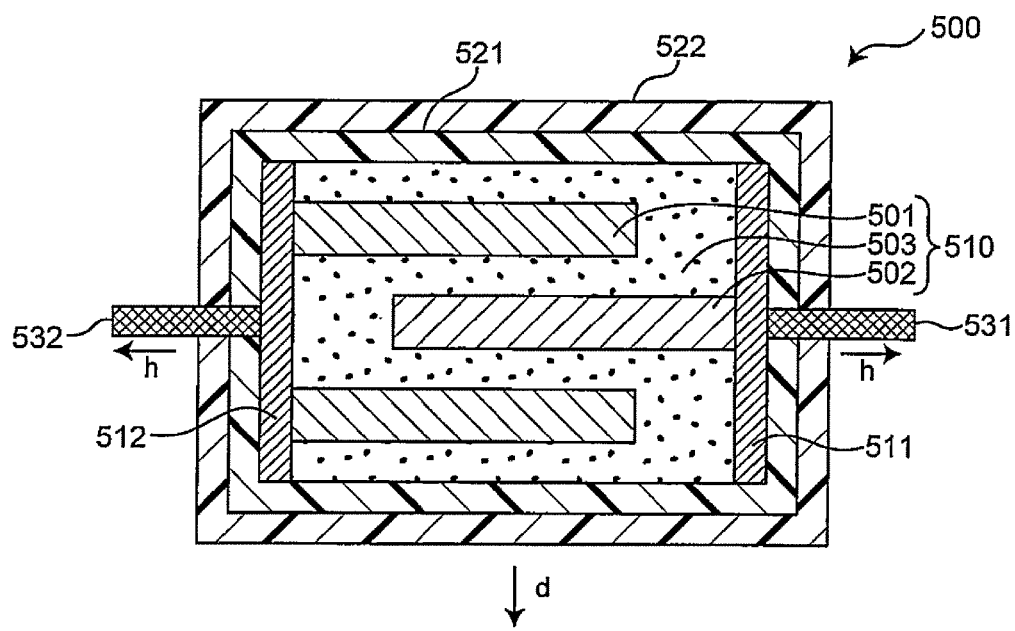

SOLID-STATE BATTERY

CROSS REFERENCE TO RELATED APPLICATIONS

The present application is a continuation of International application No. PCT/JP2020/048537, filed Dec. 24, 2020, which claims priority to Japanese Patent Application No. 2019-238870, filed Dec. 27, 2019, the entire contents of each of which are incorporated herein by reference.

FIELD OF THE INVENTION

The present invention relates to a solid-state battery.

BACKGROUND OF THE INVENTION

In recent years, the demand for batteries as power sources for portable electronic devices such as mobile phones and portable personal computers has been increasing. In the batteries used for such applications, an electrolyte (electrolytic solution) such as an organic solvent has been used in the related art as a medium for moving ions. However, in the battery having the above configuration, there is a risk that the electrolytic solution leaks. In addition, an organic solvent or the like used for the electrolytic solution is a flammable substance. Therefore, it is required to enhance the safety of the battery.

Therefore, in order to enhance the safety of the battery, a solid-state battery using a solid electrolyte as an electrolyte instead of the electrolytic solution has been studied.

As a solid-state battery, for example, as illustrated in FIG. 8, there is known a solid-state battery 500 including a solid-state battery main portion 510 formed by alternately stacking a positive electrode layer 501 and a negative electrode layer 502 with a solid electrolyte layer 503 interposed therebetween, and end surface electrodes 511 (and 512) disposed on each of two side surfaces opposing the solid-state battery main portion 510 (for example, Patent Document 1). Specifically, in such a solid-state battery 500, while the surfaces of the solid-state battery main portion 510 and the end surface electrodes 511 and 512 are coated with a waterproof layer 521 and an elastic layer 522, the power can be extracted to the outside by linear extraction wirings 531 and 532 electrically connected to the end surface electrodes 511 and 512.

Patent Document 1: Japanese Patent Application Laid-Open No. 2015-220099

SUMMARY OF THE INVENTION

However, the inventors of the present invention have found that when the solid-state battery in the related art is mounted on a substrate such as a circuit or an element, there is a new problem of being inferior in mountability.

Specifically, in the solid-state battery in the related art, as illustrated in FIG. 8, the linear extraction wirings 531 and 532 are used, and it has been found that stress concentrates on the connection portions between the extraction wirings 531 and 532 and the end surface electrodes 511 and 512 at the time of mounting, so that a connection failure between the extraction wirings and the end surface electrodes is likely to occur.

In the solid-state battery in the related art, as illustrated in FIG. 8, the extraction wirings 531 and 532 are led out in a substantially horizontal direction (substantially left-right direction in the drawing). Therefore, it is necessary to connect the extraction wirings 531 and 532 once led out in the substantially horizontal direction h toward a direction (that is, substantially downward direction) d of a substrate (not shown) disposed on a bottom surface (lower side in the drawing) of the solid-state battery at the time of mounting. As described above, since a forming direction (that is, the substantially horizontal direction) h of the extraction wiring is different from a mounting direction (that is, the substantially downward direction) d of the solid-state battery on the substrate, it has been found that a connection failure between the solid-state battery and the substrate is likely to occur.

Further, the inventors of the present invention have also found that, from the viewpoint of gas barrier properties, even when a waterproof layer is provided on the solid-state battery, the solid-state battery in the related art has a new problem of being inferior in the gas barrier properties.

Specifically, as illustrated in FIG. 8, it has been found that since the extraction wirings 531 and 532 penetrate the waterproof layer relatively proximal to the positive electrode layer and the negative electrode layer, the infiltration of gas such as water vapor cannot be sufficiently prevented.

The present invention has been made in view of such problems, and an object thereof is to provide a solid-state battery having more excellent mountability.

An object of the present invention is to provide a solid-state battery having more excellent mountability and gas barrier properties as well.

The inventors of the present application have tried to solve the above problems by addressing in a new direction instead of addressing in an extension of the related art. As a result, the present inventors have reached the invention of a solid-state battery in which the above main object has been achieved.

The present invention relates to a solid-state battery that includes: a solid-state battery main portion having a positive electrode layer and a negative electrode layer alternatively stacked with a solid electrolyte layer interposed therebetween; a first end surface electrode electrically connected to the positive electrode layer and disposed on a first side surface of the solid-state battery main portion; a second end surface electrode electrically connected to the negative electrode layer and disposed on a second side surface of the solid-state battery main portion; a first lower surface electrode electrically connected to the first end surface electrode and disposed on a lower surface side of the solid-state battery main portion; and a second lower surface electrode electrically connected to the second end surface electrode and disposed on the lower surface side of the solid-state battery main portion.

The solid-state battery of the present invention can more sufficiently prevent a connection failure between the lower surface electrode and the end surface electrode and a connection failure between the solid-state battery and the substrate, and thus is more excellent in the mountability.

BRIEF EXPLANATION OF THE DRAWINGS

FIG. 8 is a sectional view schematically illustrating a structure of a solid-state battery in a related art.

DETAILED DESCRIPTION OF THE INVENTION

Figure 1A:
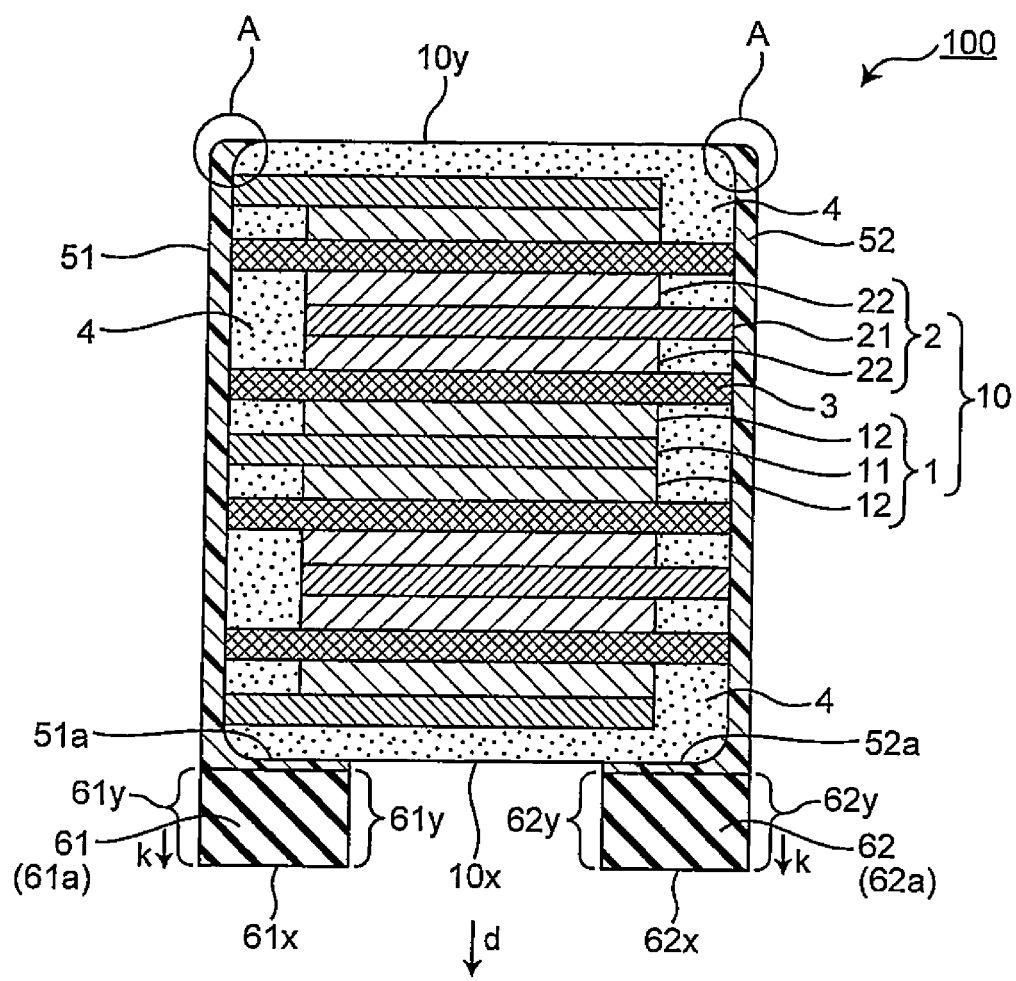
FIG. 1A is a sectional view schematically illustrating a structure of a solid-state battery according to a first embodiment of the present invention.

Hereinafter, the solid-state battery of the present invention will be described in detail. Although the description will be made with reference to the drawings as necessary, the illustrated contents are only schematically and exemplarily illustrated for the understanding of the present invention, and appearances, dimensional ratios, and the like may be different from actual ones.

The term "solid-state battery" used in the present invention refers to a battery whose constituent elements are formed of a solid in a broad sense, and refers to an all-solid-state battery whose constituent elements (particularly preferably all constituent elements) are formed of a solid in a narrow sense. In a preferred aspect, the solid-state battery in the present invention is a layered solid-state battery configured such that layers constituting a battery constituent unit are stacked on each other, and preferably such layers are formed of a sintered body. The "solid-state battery" includes not only a so-called "secondary battery" capable of repeating charging and discharging but also a "primary battery" capable of only discharging. In a preferred aspect of the present invention, the "solid-state battery" is a secondary battery. The "secondary battery" is not excessively limited by the name, and may include, for example, an electrochemical device such as a power storage device.

The term "sectional view" used in the present specification refers to a sectional state (sectional view) when viewed from a direction substantially perpendicular to a thickness direction based on a stacking direction of the electrode layers constituting the solid-state battery. The "bottom view" refers to an appearance state (bottom view) when an object is viewed from below along a thickness direction based on a stacking direction of electrode layers and the like constituting the solid-state battery. The "front view" is an appearance state when viewed from a direction substantially perpendicular to a thickness direction based on the stacking direction of the electrode layers and the like constituting the solid-state battery. The "top view" refers to an appearance state (top view) when an object is viewed from above along a thickness direction based on a stacking direction of electrode layers and the like constituting the solid-state battery. The "vertical direction" and "horizontal direction" used directly or indirectly in the present specification correspond to a vertical direction and a horizontal direction in the drawings, respectively. In particular, the "vertical direction" may be a "vertical direction" when it is assumed that the solid-state battery is mounted on a horizontal surface of the substrate. Unless otherwise specified, the same reference numerals or symbols indicate the same members/portions or the same semantic contents. In one preferred aspect, it can be considered that a vertical downward direction (that is, a direction in which gravity acts) corresponds to a "downward direction"/"lower surface side"/"bottom surface side" and the opposite direction corresponds to an "upward direction"/"upper surface side"/"top side".

The solid-state battery of the present invention will be described based on the following embodiments.

First Embodiment

The solid-state battery of the present embodiment includes a solid-state battery main portion, an end surface electrode, and a lower surface electrode.

(Solid-State Battery Main Portion)

The solid-state battery main portion has a chip shape, and includes a positive electrode layer and a negative electrode layer as internal electrodes. The solid-state battery main portion usually further includes a solid electrolyte layer. Specifically, as illustrated in FIG. 1A, the solid-state battery 100 includes a solid-state battery main portion 10 in which a negative electrode layer 1 and a positive electrode layer 2 are alternately stacked with a solid electrolyte layer 3 interposed therebetween. The chip shape is a so-called rectangular parallelepiped shape or a hexahedron shape including a cube. FIG. 1A is a sectional view schematically illustrating a structure of a solid-state battery according to the first embodiment of the present invention.

In the solid-state battery main portion, each layer constituting the solid-state battery is formed by firing, and a negative electrode layer 1, a positive electrode layer 2, a solid electrolyte layer 3, and the like form a sintered layer. Preferably, the negative electrode layer 1, the positive electrode layer 2, and the solid electrolyte layer 3 are each fired integrally with each other, and therefore, the solid-state battery main portion 10 forms an integrally sintered body.

The positive electrode layer 2 includes a positive electrode active material layer 22 containing at least a positive electrode active material. The positive electrode active material layer may further include a solid electrolyte. In a preferred aspect, the positive electrode active material layer includes a sintered body including at least positive electrode active material particles and solid electrolyte particles.

The negative electrode layer 1 includes a negative electrode active material layer 12 containing at least a negative electrode active material. The negative electrode active material layer may further include a solid electrolyte. In a preferred aspect, the negative electrode active material layer includes a sintered body including at least negative electrode active material particles and solid electrolyte particles.

The positive electrode active material and the negative electrode active material are substances involved in the transfer of electrons in the solid-state battery. Ions move (conduct) between the positive electrode active material layer and the negative electrode active material layer with the solid electrolyte layer interposed therebetween, and electrons are transferred, and thereby the charging and discharging are performed. The positive electrode layer and the negative electrode layer may be particularly layers capable of occluding and releasing a lithium ion or a sodium ion. That is, the solid-state battery may be an all-solid-state secondary battery in which lithium ions or sodium ions move between the positive electrode active material layer and the negative electrode active material layer with the solid electrolyte layer interposed therebetween to charge and discharge the battery.

The positive electrode active material contained in the positive electrode active material layer 22 is not particularly limited, and examples thereof include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$ and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

The negative electrode active material contained in the negative electrode active material layer 12 is not particularly limited, and examples thereof include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, a lithium-containing oxide having a spinel-type structure, and the like. Examples of the lithium alloy include Li—Al. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$. Examples of the lithium-containing oxide having a spinel-type structure include $Li_4Ti_5O_{12}$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, and a sodium-containing oxide having a spinel-type structure.

The solid electrolyte that can be contained in the positive electrode active material layer 22 and the negative electrode active material layer 12 may be selected from, for example, the same material as the solid electrolyte contained in the solid electrolyte layer.

The positive electrode active material layer and/or the negative electrode active material layer may contain a conductive aid. Examples of the conductive aid contained in the positive electrode active material layer and the negative electrode active material layer include at least one kind of metal materials such as silver, palladium, gold, platinum, aluminum, copper, and nickel, and carbon. Although not particularly limited, copper is preferable in that it hardly reacts with the positive electrode active material, the negative electrode active material, the solid electrolyte material, and the like, and has an effect of reducing the internal resistance of the solid-state battery.

Further, the positive electrode active material layer and/or the negative electrode active material layer may contain a sintering aid. Examples of the sintering aid include at least one selected from the group consisting of lithium oxide, sodium oxide, potassium oxide, boron oxide, silicon oxide, bismuth oxide, and phosphorus oxide.

The positive electrode layer 2 and the negative electrode layer 1 may include a positive electrode current collecting layer 21 and a negative electrode current collecting layer 11, respectively. Each of the positive electrode current collecting layer and the negative electrode current collecting layer may have a form of a foil, and may have a form of a sintered body from the viewpoint of reducing the manufacturing cost of the solid-state battery by integral firing and reducing the internal resistance of the solid-state battery. When the positive electrode current collecting layer and the negative electrode current collecting layer have a form of a sintered body, the positive electrode current collecting layer and the negative electrode current collecting layer may be formed of a sintered body containing a conductive aid and a sintering aid. The conductive aid that is contained in the positive electrode current collecting layer and the negative electrode current collecting layer may be selected from, for example, materials similar to the conductive aid that can be contained in the positive electrode active material layer and/or the negative electrode active material layer. The sintering aid that is contained in the positive electrode current collecting layer and the negative electrode current collecting layer may be selected from, for example, materials similar to the sintering aid that can be contained in the positive electrode active material layer and/or the negative electrode active material layer. In the solid-state battery, the positive electrode current collecting layer and the negative electrode current collecting layer are not essential, and a solid-state battery in which such a positive electrode current collecting layer and a negative electrode current collecting layer are not provided is also conceivable. That is, the solid-state battery in the present invention may be a solid-state battery without a current collecting layer.

The solid electrolyte layer 3 is a layer formed of a material capable of conducting lithium ions or sodium ions. In particular, the solid electrolyte layer 3 constituting a battery constituent unit in the solid-state battery forms a layer through which, for example, lithium ions or sodium ions can be conducted between the positive electrode layer and the negative electrode layer. The solid electrolyte is not particularly limited, and specific examples thereof include a lithium-containing phosphate compound having a NASICON structure, an oxide having a perovskite structure, and an oxide having a garnet-type structure or a garnet-type similar structure. Examples of the lithium-containing phosphate compound having a NASICON structure include $Li_xM_y(PO_4)_3$ ($1 \leq x \leq 2$, $1 \leq y \leq 2$, and M is at least one selected from the group consisting of Ti, Ge, Al, Ga, and Zr). Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.55}TiO_3$. Examples of the oxide having a garnet-type or garnet-type similar structure include $Li_7La_3Zr_2O_{12}$.

Examples of the solid electrolyte capable of conducting sodium ions include a sodium-containing phosphate compound having a NASICON structure, an oxide having a perovskite structure, and an oxide having a garnet-type structure or a garnet-type similar structure. Examples of the sodium-containing phosphate compound having a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte layer 3 may contain a sintering aid. The sintering aid contained in the solid electrolyte layer may be selected from, for example, materials similar to the sintering aid that can be contained in the positive electrode layer/the negative electrode layer.

The solid-state battery main portion 10 may further include an insulating layer (or insulating portion) 4. The insulating layer 4 means a layer having no electron conductivity. The insulating layer is formed of an insulating inorganic material. The insulating inorganic material is not particularly limited, and examples thereof include silica and alumina. The insulating inorganic material may be selected from the same materials as the solid electrolyte contained in the solid electrolyte layer 3. The insulating layer may contain a sintering aid, and the sintering aid may be selected from, for example, materials similar to the sintering aid that can be contained in the positive electrode layer/the negative electrode layer.

The thicknesses of the negative electrode layer 1, the positive electrode layer 2, and the solid electrolyte layer 3 are not particularly limited, and may be, for example, 0.1 μm to 1 μm.

The overall dimension of the solid-state battery main portion 10 is not particularly limited. For example, the thickness dimension of the solid-state battery main portion 10 may be 100 μm to 50 mm. The width dimension and the depth dimension of the solid-state battery main portion 10 may be independently 100 μm to 500 mm.

An edge portion (in particular, at least an edge portion A on an upper surface 10y, preferably all edge portions) of the solid-state battery main portion 10 desirably has a curved surface shape. The curved surface shape means a rounded shape, and includes a so-called round chamfered shape (that is, a shape chamfered so as to be rounded). Since the edge portion of the solid-state battery main portion 10 has the curved surface shape, continuity of the coating layer can be more significantly secured when the solid-state battery is coated with the coating layer to be described later, and as a result, coating with the coating layer can be reliably performed. The radius of the curved surface shape is not particularly limited, and may be, for example, 10 μm or more (particularly, 10 μm to 1 mm).

(End Surface Electrode)

The solid-state battery 100 includes an end surface electrode 51 (or 52) on each of two side surfaces of the solid-state battery main portion 10, preferably two opposing side surfaces. The end surface electrode 51 (or 52) is electrically connected to the negative electrode layer 1 (or the positive electrode layer 2). The end surface electrode preferably contains a material having high conductivity. A specific material of the end surface electrode is not particularly limited, and examples thereof include at least one conductive metal (that is, metal or alloy) selected from the group consisting of gold, silver, copper, platinum, tin, palladium, aluminum, titanium, nickel, oxygen-free copper, Cu—Sn alloy, Cu—Zr alloy, Cu—Fe alloy, Cu—Cr—Sn—Zn alloy, 42 alloy (Ni—Fe alloy), and Kovar alloy from the viewpoint of conductivity. By using a metal material for the end surface electrode material, entry of moisture from the end surface electrode can be suppressed.

Each of the end surface electrodes 51 and 52 may cover not only each of the two side surfaces of the solid-state battery main portion 10 but also an end portion of one or more surfaces (preferably the lower surface 10x) among four surfaces other than the two opposing side surfaces as illustrated in FIG. 1A. From the viewpoint of further improving the mountability and improving the bonding strength between the solid-state battery main portion and the lower surface electrode, each of the end surface electrodes 51 and 52 preferably covers not only each of the two side surfaces of the solid-state battery main portion 10 but also the end of the lower surface 10x of the solid-state battery main portion 10 as illustrated in FIG. 1A. In each of the end surface electrodes 51 and 52, a portion coating the end portion of the lower surface is referred to as a "lower surface coating portions" 51a and 52a.

The thicknesses of the end surface electrodes 51 and 52 are not particularly limited, and may be, for example, 0.01 μm to 1 μm, and particularly 1 μm to 100 μm.

(Lower Surface Electrode)

The solid-state battery 100 further includes lower surface electrodes 61 and 62 disposed on the lower surface 10x side of the solid-state battery main portion 10. The lower surface electrodes 61 and 62 are electrically connected to the end surface electrodes 51 and 52 electrically connected to the negative electrode layer 1 and the positive electrode layer 2, respectively.

Disposing the lower surface electrodes 61 and 62 on the lower surface 10x side of the solid-state battery main portion 10 means disposing the lower surface electrodes below the lower surface 10x. Each of the lower surface electrodes 61 and 62 may be disposed in direct contact with the lower surface 10x as long as electrical connection with the end surface electrodes 51 and 52 is secured, or may be disposed in indirect contact with the lower surface 10x with the lower surface coating portions 51a and 52a of the end surface electrodes 51 and 52, interposed therebetween as illustrated in FIG. 1A. The lower surface electrodes 61 and 62 are usually disposed immediately below the lower surface 10x of the solid-state battery main portion 10. The lower surface electrodes 61 and 62 being disposed immediately below the lower surface 10x of the solid-state battery main portion 10 means that the lower surface electrodes 61 and 62 (particularly, lower surface portions 61a and 62a to be described later) are disposed at positions hidden by the solid-state battery main portion 10 and invisible when the solid-state battery is viewed from above.

The lower surface electrodes 61 and 62 are in surface contact with the solid-state battery main portion 10 or the end surface electrodes 51 and 52. The surface contact means that two members in contact are in surface contact with each other. At this time, in each of the two members, a region in surface contact is provided by at least a part of the main surface of the member. The main surface is the widest surface of the member regardless of a flat surface or a curved surface. Specifically, as illustrated in FIG. 1A, the lower surface electrodes 61 and 62 may be in surface contact with a part (lower surface coating portions 51a and 52a) of the end surface electrodes 51 and 52, or may be in surface contact directly with the lower surface 10x of the solid-state battery main portion 10 without interposing the lower surface coating portions 51a and 52a. When the lower surface electrodes 61 and 62 are in direct surface contact with the lower surface 10x of the solid-state battery main portion 10 without interposing the lower surface coating portions 51a and 52a, electrical connection between the lower surface electrodes 61 and 62 and the end surface electrodes 51 and 52 may be secured at the end portions of the lower surface electrodes 61 and 62.

The lower surface electrodes 61 and 62 may have any shape as long as they can be brought into surface contact with the lower surface 10x (or lower surface coating portions 51a and 52a of end surface electrodes 51 and 52) of the solid-state battery main portion 10. Specific examples of the shape that the lower surface electrode can have include a plate shape. In the present specification, the term "plate shape" is used in a concept including a thin film shape having a thickness of about 1 nm or more and less than 1 μm, a film shape having a thickness of about 1 μm to 500 μm, and a sheet shape having a thickness of more than 500 μm and about 1 mm or less. In FIG. 1A, each of lower surface electrodes 61 and 62 has only each of plate-shaped lower surface portions 61a and 62a disposed on the lower surface 10x side of solid-state battery main portion 10.

In the present embodiment, the solid-state battery 100 includes lower surface electrodes 61 and 62 electrically connected to the end surface electrodes 51 and 52 and disposed on the lower surface 10x side of the solid-state battery main portion 10, and is mounted on a substrate and takes out electric power by the lower surface electrodes.

Since the lower surface electrodes 61 and 62 have a plate shape and are in surface contact with the lower surface 10x (or lower surface coating portions 51a and 52a of end surface electrodes 51 and 52) of the solid-state battery main portion 10, concentration of stress on the connection portions between the lower surface electrodes 61 and 62 and the end surface electrodes 51 and 52 is avoided at the time of mounting on the substrate. As a result, connection failure between the lower surface electrode and the end surface electrode can be more sufficiently prevented, and the mountability is improved.

In addition, a forming direction (that is, the stacking direction) k of the lower surface electrodes 61 and 62 and a mounting direction (that is, the substantially downward direction) d of the solid-state battery on the substrate have a relationship of substantially the same direction. Therefore, the connection failure between the solid-state battery and the substrate can be more sufficiently prevented, and the mountability is further improved.

Then lower surface electrode preferably contains a material having high conductivity. A specific material of the lower surface electrode is not particularly limited, and from the viewpoint of the conductivity, a material similar to the conductive metal exemplified as the specific material of the end surface electrode can be exemplified. By using a metal material for the lower surface electrode material, entry of moisture from the lower surface electrode can be suppressed.

(Coating Layer)

Figure 1B:
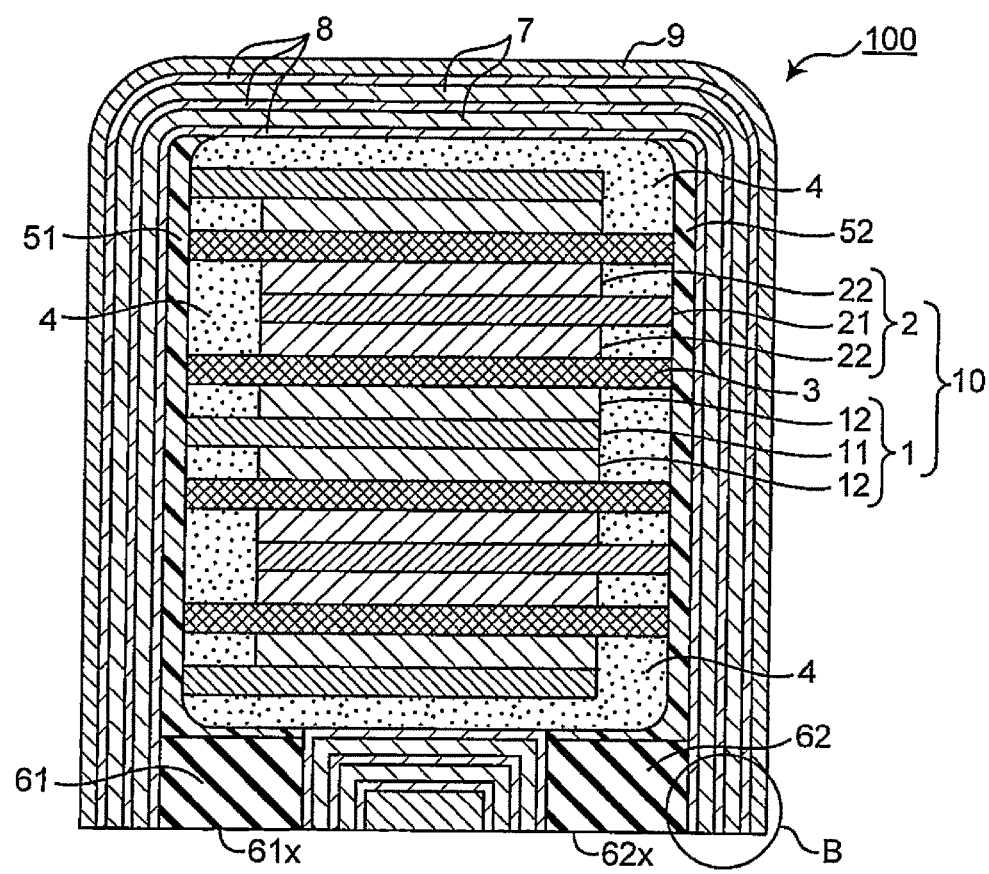
FIG. 1B is a sectional view schematically illustrating a structure of the solid-state battery in a case where the solid-state battery of FIG. 1A has a coating layer.
Figure 1C:
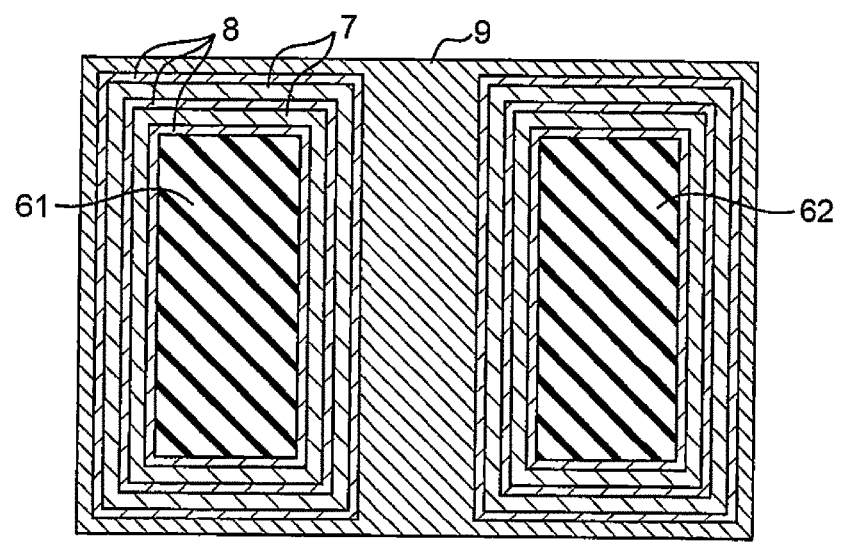
FIG. 1C is a bottom view of the solid-state battery of FIG. 1B.
Figure 1D:
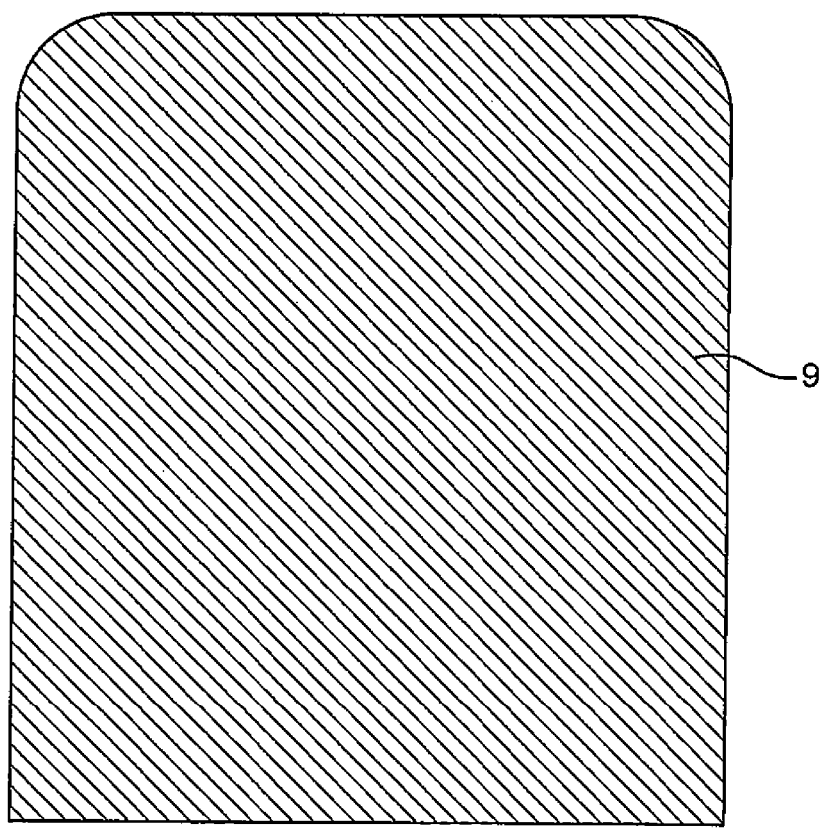
FIG. 1D is a front view of the solid-state battery of FIG. 1B.

The solid-state battery of the present embodiment preferably has a coating layer from the viewpoint of gas barrier properties. As illustrated in FIG. 1A, FIG. 1B, FIG. 1C, and FIG. 1D, the coating layer is formed on all surfaces of lower surface electrodes 61 and 62 in solid-state battery 100 except for bottom surfaces 61x and 62x. All the surfaces of the lower surface electrodes 61 and 62 of the solid-state battery 100 other than the bottom surfaces 61x and 62x include the exposed surface of the solid-state battery main portion 10, the surfaces of the end surface electrodes 51 and 52, and the side surfaces 61y and 62y of the lower surface electrodes 61 and 62. FIG. 1B is a sectional view schematically illustrating a structure of the solid-state battery in a case where the solid-state battery of FIG. 1A has a coating layer. FIG. 1C is a bottom view of the solid-state battery of FIG. 1B. FIG. 1D is a front view of the solid-state battery of FIG. 1B.

The coating layer includes at least one barrier layer 7. The coating layer preferably further includes one or more layers selected from the group consisting of a buffer layer 8 and an impact resistant layer 9. The coating layer more preferably further includes one or more buffer layers 8 and one impact resistant layer 9.

In the present embodiment, the solid-state battery 100 includes lower surface electrodes 61 and 62 electrically connected to the end surface electrodes 51 and 52 and disposed on the lower surface 10x side of the solid-state battery main portion 10, and is mounted on a substrate and takes out electric power by the lower surface electrodes. Therefore, when the solid-state battery includes a coating layer including a barrier layer, the barrier layer can coat the surface of the solid-state battery without penetrating relatively proximal to the positive electrode layer and the negative electrode layer. As a result, the infiltration of gas such as water vapor can be more sufficiently prevented.

When the coating layer includes the impact resistant layer 9, the impact resistant layer 9 is preferably disposed as the outermost layer as illustrated in FIG. 1B from the viewpoint of impact resistance from the outside and reduction of distortion as a device. By alternately coating the buffer layer and the barrier layer, there is also an effect of obtaining further flexibility and an effect of preventing pinholes, and it is possible to improve the barrier properties of water vapor and ions. In other words, by disposing the buffer layer adjacent to the barrier layer, an effect of obtaining further flexibility and an effect of preventing pinholes can be exhibited. When the buffer layer and the barrier layer are alternately coated, either the buffer layer or the barrier layer may end up to the impact resistant layer of the outermost layer. Disposing the buffer layer adjacent to the barrier layer means disposing the buffer layer in direct contact with the barrier layer. The outermost layer is a layer disposed most distally from the solid-state battery main portion among layers constituting the coating layer.

The coating layer preferably further includes an interface layer (not shown) as an innermost layer. That is, among the layers constituting the coating layer, the innermost layer is preferably an interface layer. When the coating layer includes the interface layer as the innermost layer, the solder wettability of the surface coated with the interface layer can be improved, the adhesiveness to the barrier layer or the buffer layer coated on the interface layer can be improved, and entry of moisture from the interface between the coating layer and the solid-state battery can be suppressed. The innermost layer is a layer disposed closest to the solid-state battery main portion among the layers constituting the coating layer.

The coating layer includes, but is not limited to, an interface layer (not shown) as the innermost layer, an impact resistant layer 9 as the outermost layer, and three buffer layers 8 and two barrier layers 7 alternately arranged between the innermost layer and the outermost layer in FIGS. 1B, 1C, and 1D.

For example, in FIGS. 1B, 1C and 1D, the impact resistant layer 9 of the two barrier layers 7 may not be formed with one buffer layer 8 between the nearest barrier layer 7 and the impact resistant layer 9.

Further, for example, in FIGS. 1B, 1C, and 1D, the impact resistant layer 9 among the three buffer layers 8 may further include one barrier layer 7 between the buffer layer 8 nearest to the impact resistant layer 9 and the impact resistant layer 9.

The barrier layer 7 is a layer for preventing permeation of a gas such as water vapor. Specifically, the barrier layer 7 usually has a water vapor permeation rate of $1.0 \times 10^{-2}$ g/(m²·Day) or less, preferably $1 \times 10^{-4}$ g/(m²·Day) to $8 \times 10^{-3}$ g/(m²·Day), more preferably $1 \times 10^{-4}$ g/(m²·Day) to $8 \times 10^{-4}$ g/(m²·Day). The water vapor permeation rate of the barrier layer 7 is, for example, $4 \times 10^{-4}$ g/(m²·Day). When the coating layer includes two or more barrier layers 7, the water vapor permeation rates of the two or more barrier layers 7 may be each independently within the above range. In the present specification, the water vapor permeation rate refers to a permeation rate obtained by using a gas permeation rate measuring apparatus of model GTms −1 manufactured by Advanced Riko Co., Ltd. under measurement conditions of 40° C. and 90% RH differential pressure of 1 atm.

The barrier layer 7 usually has non-conductivity. Specifically, the barrier layer 7 usually has a surface resistivity of $1.0 \times 10^6$ Ω/sq. or more and preferably $1.0 \times 10^8$ Ω/sq. or more. When the coating layer includes two or more barrier layers 7, the surface resistivity of the two or more barrier layers 7 may be each independently within the above range. In the present specification, as the surface resistivity, a value obtained by measuring a sample having a thickness of 0.1 mm at 25° C. by MCP-HT450 manufactured by Mitsubishi Chemical Analytech Co., Ltd. is used.

The barrier layer 7 is desirably a layer that prevents permeation of alkali metal ions such as Li ions in consideration of an influence on an external semiconductor component. Examples of the material constituting the barrier layer 7 include a nitride film and an oxynitride film. The nitride film and the oxynitride film are preferably made of silicon or aluminum, and the nitride film and the oxynitride film are more preferably silicon nitride ($SiN_t$) and silicon oxynitride ($SiN_tO_u$), respectively. Here, t and u are numerical values larger than 0. A silicon oxynitride film is preferable from the viewpoint of preventing peeling and cracking due to deformation by an external force. The barrier layer 7 is more preferably a silicon oxynitride film in which the refractive index of light is 1.7 or more (particularly 1.7 to 2.0) by suppressing the ratio of oxygen to be low (setting the value of u to be low). As other materials constituting the barrier layer 7, it is necessary to coat the barrier layer 7 with a ceramic material such as low-melting-point glass or a claist which is a viscosity material. The low-melting-point glass is bismuth, lead, boron, or vanadium-based glass, and indicates a material having a glass transition point of 500° C. or less. The claist is a clay-like layered compound, and has a water vapor permeation rate of $1.0 \times 10^{-2}$ g/(m²·Day) or less, preferably $1 \times 10^{-4}$ g/(m²·Day) to $8 \times 10^{-3}$ g/(m²·Day), more preferably $1 \times 10^{-4}$ g/(m²·Day) to $8 \times 10^{-4}$ g/(m²·Day).

The thickness of the barrier layer 7 may be usually, for example, 10 nm to 100 μm, and particularly 100 nm to 10 μm.

The buffer layer 8 is a layer for causing the coating layer to follow expansion and shrinkage during charging and discharging of the solid-state battery, and is a layer for preventing destruction of the barrier layer 7. By disposing the buffer layer 8 in direct contact with the barrier layer 7, it is possible to cause the coating layer to follow expansion and shrinkage during charging and discharging while preventing destruction of the barrier layer 7, and as a result, excellent gas barrier properties can be obtained for a sufficiently long period of time.

The buffer layer 8 usually has non-conductivity. Specifically, the buffer layer 8 may usually have a surface resistivity within a range similar to that of the barrier layer 7. When the coating layer includes two or more buffer layers 8, the surface resistivity of the two or more buffer layers 8 may be each independently within the above range.

The constituent material of the buffer layer 8 is not particularly limited as long as the buffer layer itself is a material capable of following expansion and contraction during charging and discharging of the solid-state battery. Examples of the constituent material of the buffer layer include a polyimide resin, a polyimide silicone resin, a silicone resin, a polyamide resin, an epoxy resin, and rubber.

The thickness of the buffer layer 8 may be usually, for example, 1 μm to 1 mm, and particularly 10 μm to 100 μm.

The impact resistant layer 9 is a layer for preventing damage due to thermal shock during mounting by reflow of the solid-state battery and physical shock during handling of the solid-state battery. By disposing the impact resistant layer 9 as the outermost layer, it is possible to cause the coating layer to follow expansion and shrinkage during charging and discharging while preventing destruction of the barrier layer 7, and as a result, excellent gas barrier properties can be obtained for a sufficiently long period of time.

The impact resistant layer 9 usually has non-conductivity. Specifically, the impact resistant layer 9 may usually have a surface resistivity within a range similar to that of the barrier layer 7.

The constituent material of the impact resistant layer 9 is not particularly limited, and examples thereof include a mold resin including a resin and a filler. Examples of the resin include the same resins exemplified as the constituent materials of the buffer layer. Examples of the filler include silica, alumina, SiC (silicon carbide), and BN (boron nitride). A preferable constituent material of the impact resistant layer 9 is an epoxy resin mixed with silica.

The thickness of the impact resistant layer 9 is set to a thickness that can be suppressed to swell by 10% or less with respect to expansion displacement in charging of the solid-state battery. The thickness of the impact resistant layer 9 may be usually, for example, 1 µm to 1 mm, and particularly 10 µm to 100 µm.

The interface layer (not shown) is a layer disposed at the interface between the coating layer and the solid-state battery, and is a layer that improves the wettability of the surface (for example, the surface of the solid-state battery) coated with the interface layer and improves the adhesiveness with the barrier layer or the buffer layer coated on the interface layer. By disposing the interface layer as the innermost layer, entry of moisture from the interface between the coating layer and the solid-state battery can be further sufficiently suppressed.

The interface layer usually has non-conductivity. Specifically, the interface layer may usually have a surface resistivity within a range similar to that of the barrier layer 7.

The constituent material of the interface layer is not particularly limited, and examples thereof include a silane coupling material, a silica film, an alumina film, an oxynitride film, and a polysilazane film.

The thickness of the interface layer is not particularly limited, and may be, for example, 0.01 µm to 100 µm, particularly 0.1 µm to 10 µm.

All the layers of the barrier layer 7, the buffer layer 8, the impact resistant layer 9, and the interface layer (not shown) constituting the coating layer are formed on all surfaces of the lower surface electrodes 61 and 62 other than the bottom surfaces 61$x$ and 62$x$ in the solid-state battery. That is, the innermost layer coats all surfaces of the lower surface electrodes 61 and 62 other than the bottom surfaces 61$x$ and 62$x$. The layer other than the innermost layer constituting the coating layer coats the surface of the layer immediately below corresponding to all the surfaces other than the bottom surfaces 61$x$ and 62$x$ of the lower surface electrodes 61 and 62.

Figure 1E:
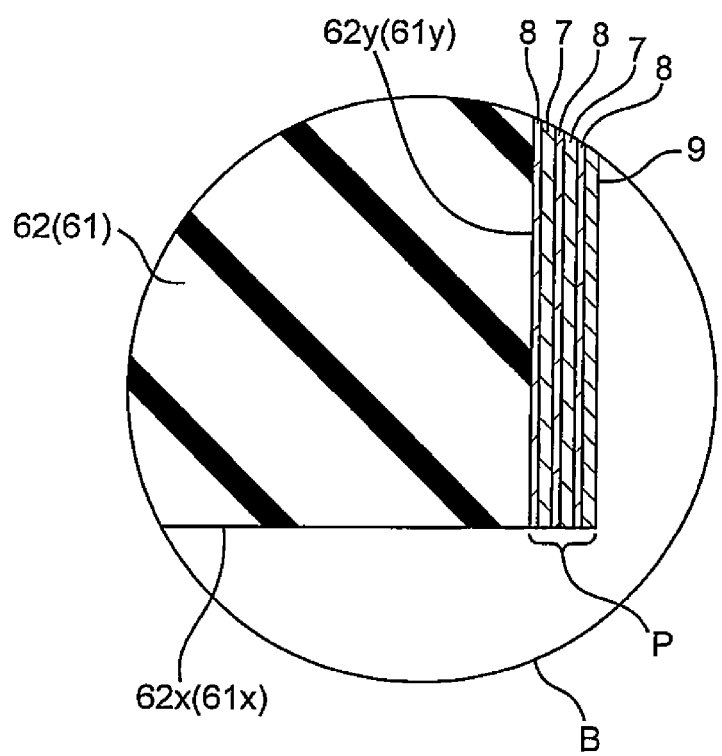
FIG. 1E is a partial enlarged sectional view of a side surface of a lower surface electrode illustrating a state in which all layers constituting the coating layer have exposed end surfaces on a side surface of a lower surface electrode in sectional view in the solid-state battery of FIG. 1B.

Each of the layers such as the barrier layer 7, the buffer layer 8, the impact resistant layer 9, and the interface layer (not shown) constituting the coating layer may independently have an exposed end surface P on the side surfaces 61$y$ and 62$y$ (refer to FIG. 1A) (particularly, in the vicinity of the bottom surface or the lower end portion thereof) of the lower surface electrodes 61 and 62 in a sectional view or a bottom view as illustrated in FIGS. 1B, 1C, and 1E. Here, "exposure" means "exposure" of the layer to the surrounding atmosphere. Even if each of the layers has the exposed end surface P, the end surface P is disposed on the side surfaces 61$y$ and 62$y$ (refer to FIG. 1A) (particularly, in the vicinity of the bottom surface or the lower end portion thereof) of the lower surface electrodes 61 and 62, and is relatively distal to the positive electrode layer and the negative electrode layer, so that it is possible to more sufficiently prevent infiltration of gas such as water vapor. FIG. 1E is a partial enlarged sectional view of a part B in the solid-state battery of FIG. 1B. Specifically, FIG. 1E is a partial enlarged sectional view of a side surface of a lower surface electrode illustrating a state in which all layers constituting the coating layer have exposed end surfaces on a side surface of a lower surface electrode in sectional view in the solid-state battery of FIG. 1B.

(Method for Manufacturing Solid-State Battery)

The solid-state battery according to the present embodiment can be manufactured by a method including: preparing a solid-state battery main portion 10; forming end surface electrodes 51 and 52; and forming lower surface electrodes 61 and 62.

When the solid-state battery has a coating layer, the method for manufacturing a solid-state battery further includes forming a coating layer.

Hereinafter, for better understanding of the present invention, one manufacturing method will be exemplified and described, but the present invention is not limited thereto. In addition, temporal matters such as the following description order are merely for convenience of description, and are not necessarily limited thereto.

Step of Preparing Solid-State Battery Main Portion

In this step, usually, the solid-state battery main portion 10 having a chip shape with six surfaces and including a positive electrode and a negative electrode as internal electrodes is prepared. The solid-state battery main portion 10 can be manufactured by a printing method such as a screen printing method, a green sheet method using a green sheet, or a composite method thereof. That is, the solid-state battery main portion 10 may be manufactured according to a common method for manufacturing a solid-state battery. Therefore, as raw material substances such as a solid electrolyte, an organic binder, a solvent, an optional additive, a positive electrode active material, and a negative electrode active material described below, those used in the manufacturing of known solid-state batteries may be used.

For example, a solid electrolyte, an organic binder, a solvent, and optional additives are mixed to prepare a slurry. Next, sheets having a thickness of about 10 µm after firing are obtained from the prepared slurry by sheet molding.

A positive electrode active material, a solid electrolyte, a conductive aid, an organic binder, a solvent, and an optional additive are mixed to prepare a positive electrode paste. Similarly, a negative electrode active material, a solid electrolyte, a conductive aid, an organic binder, a solvent, and an optional additive are mixed to prepare a negative electrode paste.

The sheet is obtained by printing a positive electrode paste on the sheet, and printing a current collecting layer and/or a negative layer as necessary. Similarly, the sheet is obtained by printing a negative electrode paste on the sheet, and printing a current collecting layer and/or a negative layer as necessary.

A sheet on which the positive electrode paste is printed and a sheet on which the negative electrode paste is printed are alternately stacked to obtain a laminate. The outermost layer (uppermost layer/lowermost layer) of the laminate is usually an insulating layer (or a solid electrolyte layer).

After the laminate is pressure-bonded and integrated, the laminate is cut into individual pieces. The obtained cut laminate is subjected to degreasing and firing. Thus, a sintered laminate is obtained as the solid-state battery main portion 10. The laminate may be subjected to degreasing and firing before cutting, and then cut.

Step of Forming End Surface Electrode

The end surface electrode on the positive electrode side can be formed by a dry plating method such as physical vapor deposition (PVD) or chemical vapor deposition (CVD) on the positive electrode exposed side surface in the sintered laminate. Examples of the physical vapor deposition method (PVD) include a vacuum deposition method and a sputtering method (in particular, an ion beam sputtering method). Examples of the chemical vapor deposition method (CVD) include a thermal CVD method and a plasma CVD method.

Similarly, the end surface electrode on the negative electrode side can be formed on the negative electrode exposed side surface in the sintered laminate by a dry plating method described above.

Alternatively, or in combination, the end surface electrode on the positive electrode side can be formed by applying and sintering a conductive paste to the positive electrode exposed side surface of the sintered laminate. Similarly, the end surface electrode on the negative electrode side can be formed by applying and sintering a conductive paste to the negative electrode exposed side surface of the sintered laminate. The end surface electrode on the positive electrode side and the negative electrode side are not limited to be formed after sintering of the laminate, and may be formed before firing and subjected to simultaneous sintering.

The end surface electrode can usually be formed using a mask in the above method. For example, the end surface electrode can be formed in a portion other than the portion hidden by the mask using an ion beam sputtering apparatus.

Step of Forming Lower Surface Electrode

The lower surface electrode is formed on the lower surface side of the solid-state battery main portion 10.

The lower surface electrode on the positive electrode side can be formed by the dry plating method described above so as to be electrically connected to the end surface electrode on the positive electrode side.

Similarly, the lower surface electrode on the negative electrode side can be formed by the dry plating method described above so as to be electrically connected to the end surface electrode on the negative electrode side.

Alternatively, or in combination, the lower surface electrode on the positive electrode side can be formed by applying and sintering a conductive paste. Similarly, the end surface electrode on the negative electrode side can be formed by applying and sintering a conductive paste. The lower surface electrode on the positive electrode side and the negative electrode side are not limited to be formed after sintering of the laminate, and may be formed before firing and subjected to simultaneous sintering.

The lower surface electrode can usually be formed using a mask in the above method. For example, the lower surface electrode can be formed in a portion other than the portion hidden by the mask using an ion beam sputtering apparatus.

Step of Forming Coating Layer

Figure 1F:
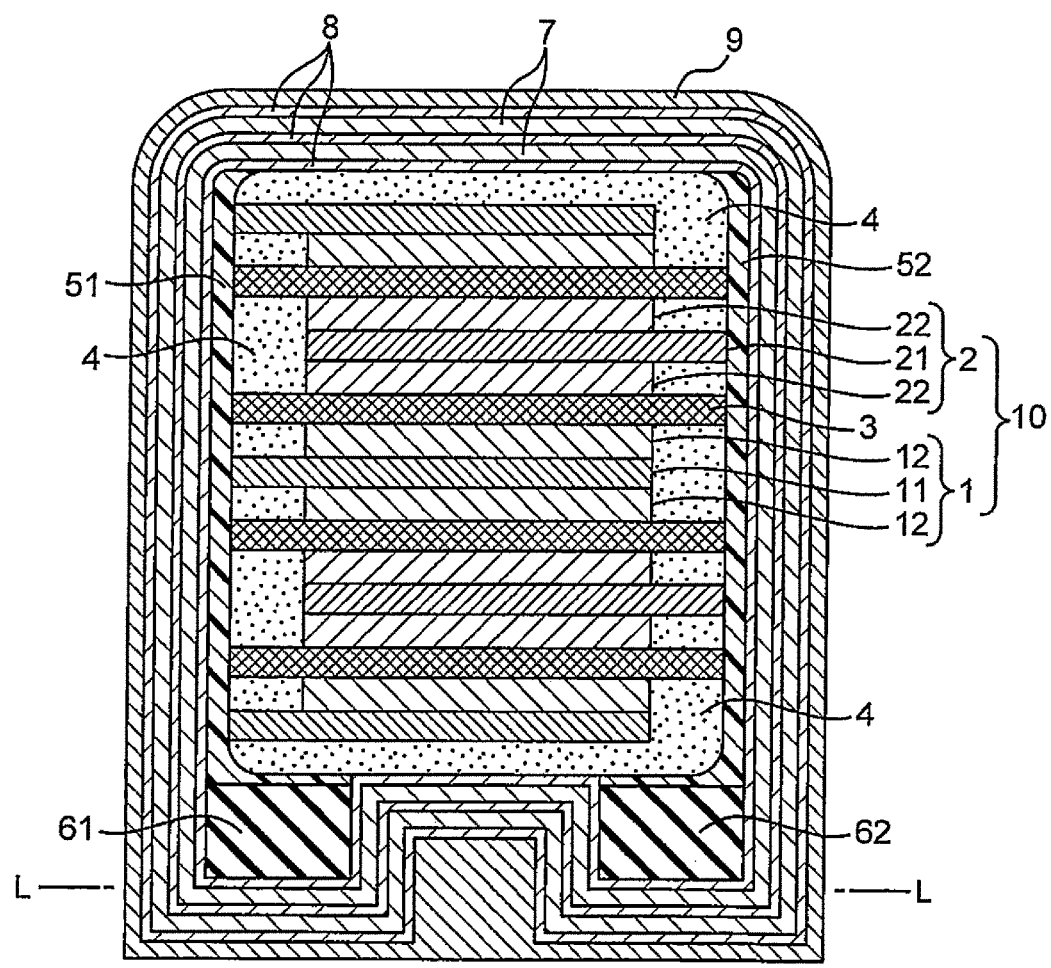
FIG. 1F is a sectional view schematically illustrating a structure of a solid-state battery precursor for explaining a method for manufacturing the solid-state battery of FIG. 1B.

Each layer constituting the coating layer is formed on the entire surface of the solid-state battery before packaging obtained so far, and for example, the solid-state battery precursor illustrated in FIG. 1F is obtained. The "packaging" means, in a broad sense, a step of protecting the solid-state battery from an external environment, and in a narrow sense, an action of forming a coating layer so that water vapor in the external environment does not enter the inside of the solid-state battery.

A method for forming each layer is not particularly limited.

The interface layer (not shown) can be formed, for example, by applying a coating liquid for an interface layer and drying the coating liquid.

The barrier layer 7 can be formed, for example, by applying a coating liquid for a barrier layer and drying the coating liquid, or can also be formed by the dry plating method described above.

The buffer layer 8 can be formed, for example, by applying a coating liquid for a buffer layer and drying the coating liquid.

The impact resistant layer 9 can be formed, for example, by applying a coating liquid for an impact resistant layer and drying the coating liquid.

In the method for forming each layer, application may be achieved by any method. Examples thereof include a dip coating method, a brush coating method, a blade coating method, a wire bar coating method, a spray coating method, a bead coating method, an air knife coating method, and a curtain coating method.

After the solid-state battery precursor illustrated in FIG. 1F is obtained, the solid-state battery illustrated in FIG. 1B can be obtained by cutting or polishing a portion below the line L-L illustrated in FIG. 1F.

Second Embodiment

The solid-state battery of the present embodiment is the same as the solid-state battery of the first embodiment except that it has the following features.

Figure 2A:
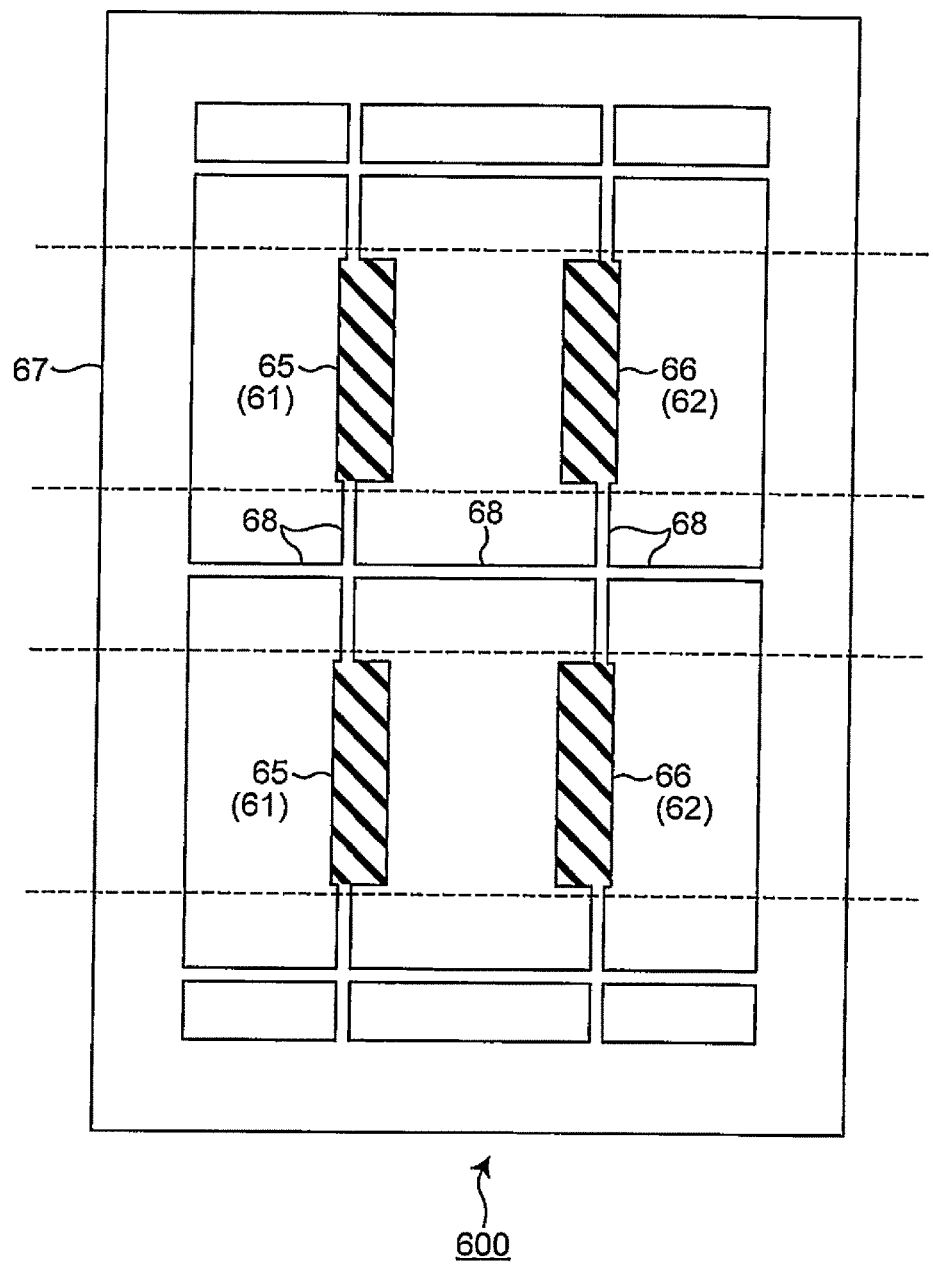
FIG. 2A is a schematic view (top view) of a lead frame sheet including a plurality of lead frames that provide the lower surface electrode.
Figure 2B:
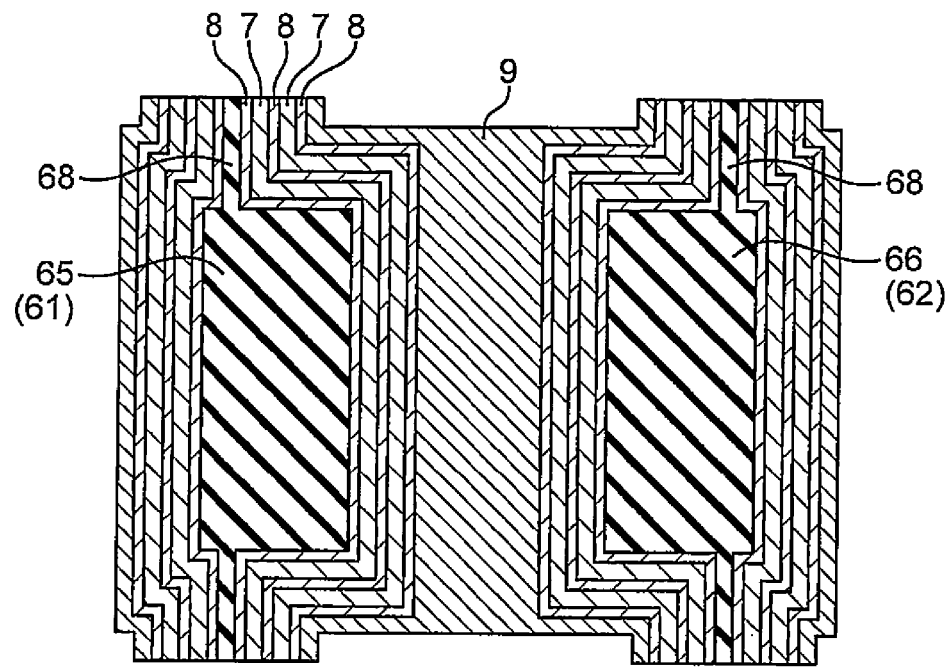
FIG. 2B is a bottom view of a solid-state battery according to a second embodiment of the present invention using the lead frame as the lower surface electrode.
Figure 2C:
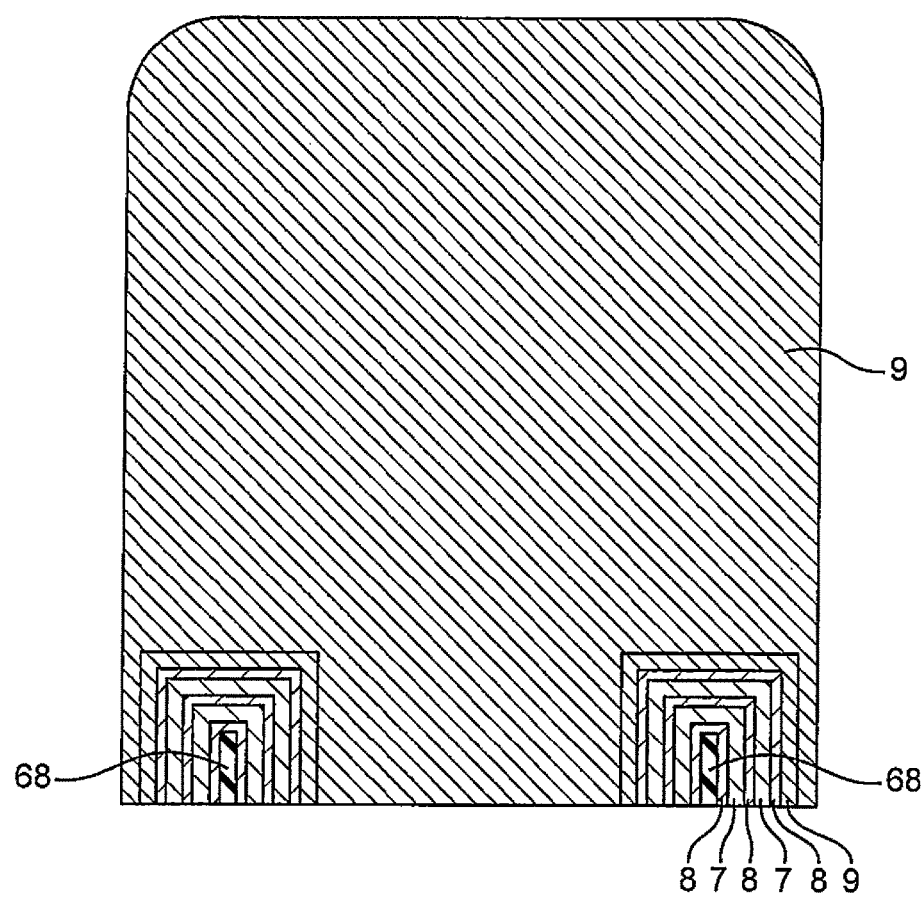
FIG. 2C is a front view of the solid-state battery of FIG. 2B.

As illustrated in FIGS. 2A, 2B, and 2C, the lower surface electrodes 61 and 62 are provided by lead frames 65 and 66. FIG. 2A is a schematic view (top view) of a lead frame sheet including a plurality of lead frames that provide the lower surface electrode. FIG. 2B is a bottom view of a solid-state battery according to a second embodiment of the present invention using the lead frame as the lower surface electrode. FIG. 2C is a front view of the solid-state battery of FIG. 2B.

Lead frames 65 and 66 are electrode members manufactured in advance, and are provided by a lead frame sheet 600. The lead frame sheet 600 includes one or more sets of lead frames 65 and 66, a frame for lead frame 67 that holds the lead frame, and a connection portion (wire portion) 68 that fixes the frame and the lead frame. The lead frames 65 and 66, the frame for lead frame 67, and the connection portion 68 included in the lead frame sheet can be easily manufactured by punching or etching one metal sheet. As the lead frame, for example, a lead frame commercially available as a lead frame of a semiconductor and a capacitor can be used. FIG. 2A illustrates a lead frame sheet 600 including lead frames 65 and 66 for two solid-state batteries.

In the solid-state battery of the present embodiment, the following effects are obtained in addition to the effects obtained in the solid-state battery of the first embodiment.

By using the lead frame, mass productivity of the solid-state battery is improved. Moreover, the use of the lead frame sheet 600 including the plurality of sets of lead frames 65 and 66 further improves the mass productivity of the solid-state battery.

Although initially connected to the positive and negative electrodes, in the method for disconnecting the connection portion of the lead frame, series connection and parallel connection are possible, and high voltage and high capacity can be easily realized, respectively.

The solid-state battery of the present embodiment can be manufactured by the same method as the solid-state battery of the first embodiment except that a step of bonding the lead frames 65 and 66 as the lower surface electrodes 61 and 62 is performed instead of the step of forming the lower surface electrodes 61 and 62.

In the step of bonding the lead frames 65 and 66, specifically, the solid-state battery main portion 10 on which the end surface electrodes 51 and 52 are formed is bonded onto the lead frames 65 and 66 illustrated in FIG. 2A. As a result, the lead frames 65 and 66 as the lower surface electrodes are formed on the lower surface side of the solid-state battery main portion 10. Bonding of the lead frames 65 (61) and 66 (62) to the end surface electrodes 51 and 52 and/or the solid-state battery main portion 10 can be achieved by sintering in a state where a metal paste containing metal particles of gold, silver, copper, platinum, tin, palladium, aluminum, titanium, nickel, SUS or the like is interposed therebetween.

After bonding the lead frames 65 and 66 and performing the step of forming a coating layer (including a cutting or polishing step below the line L-L illustrated in FIG. 1F) by the same method as in the first embodiment, the solid-state battery as illustrated in FIGS. 2B and 2C can be obtained by cutting with a dicer at the connection portion 68 (for example, a broken line illustrated in FIG. 2A) of the lead frame. In the present embodiment, since the lead frame is used and the connection portion 68 is cut, the connection portion 68 of the lead frame is exposed in the bottom view and the front view as illustrated in FIGS. 2B and 2C, respectively.

Third Embodiment

The solid-state battery of the present embodiment is the same as the solid-state battery of the first embodiment except that it has the following features.

Figure 3A:
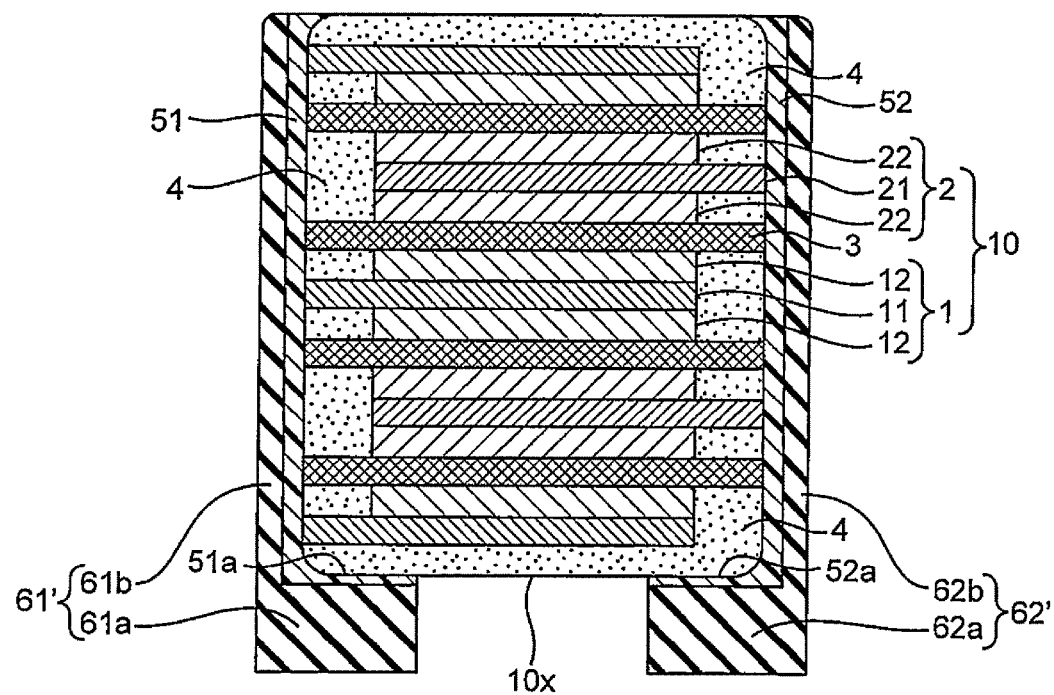
FIG. 3A is a sectional view schematically illustrating a structure of a solid-state battery according to a third embodiment of the present invention.
Figure 3B:
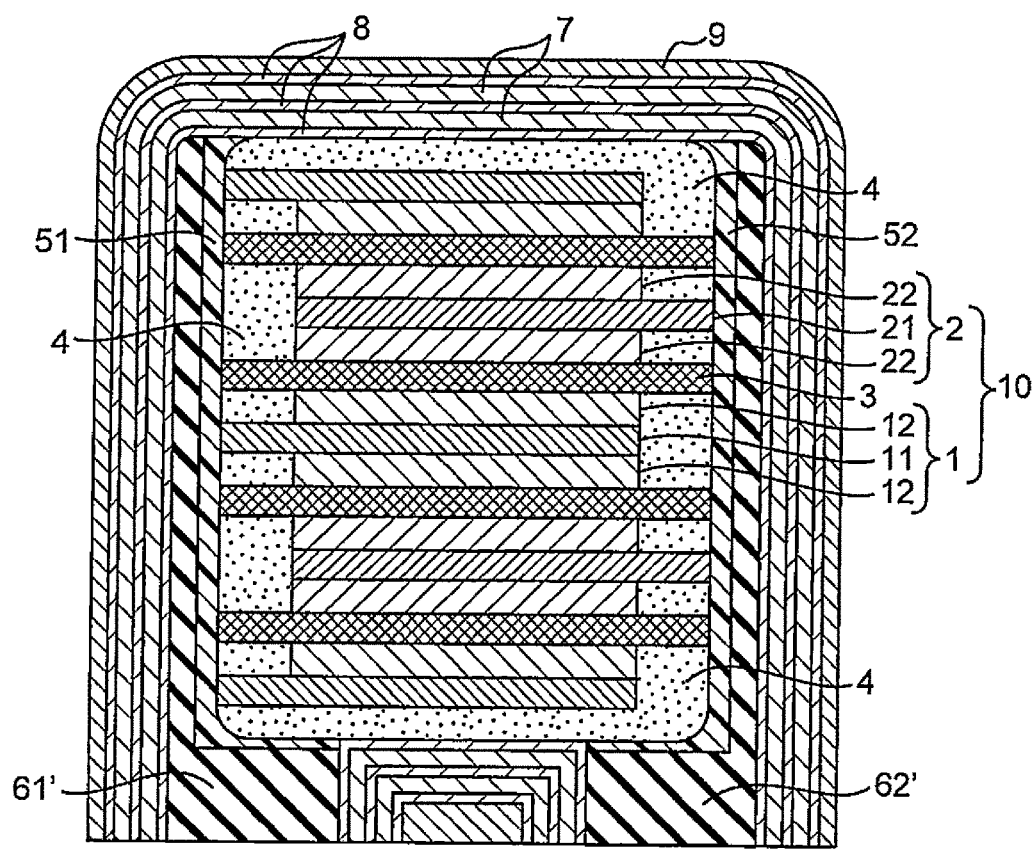
FIG. 3B is a sectional view schematically illustrating a structure of the solid-state battery in a case where the solid-state battery of FIG. 3A has a coating layer.
Figure 3C:
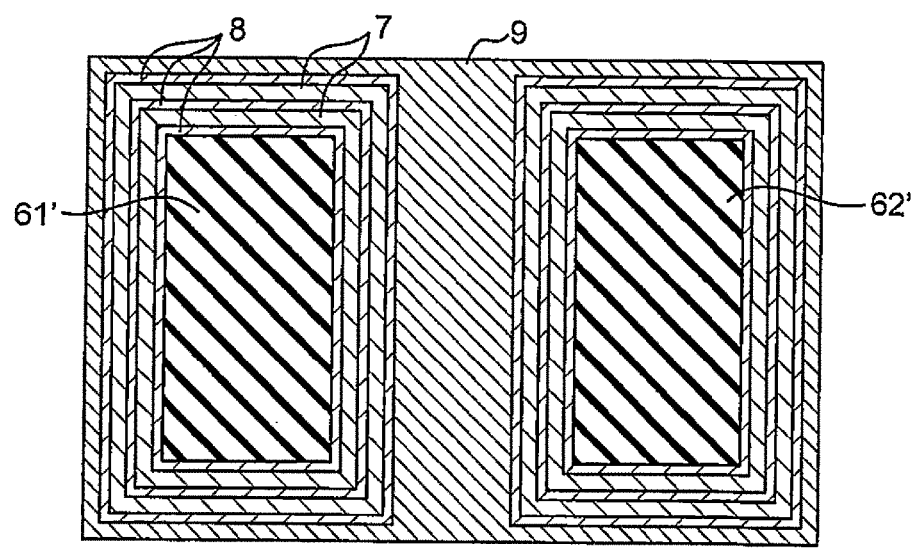
FIG. 3C is a bottom view of the solid-state battery of FIG. 3B.
Figure 3D:
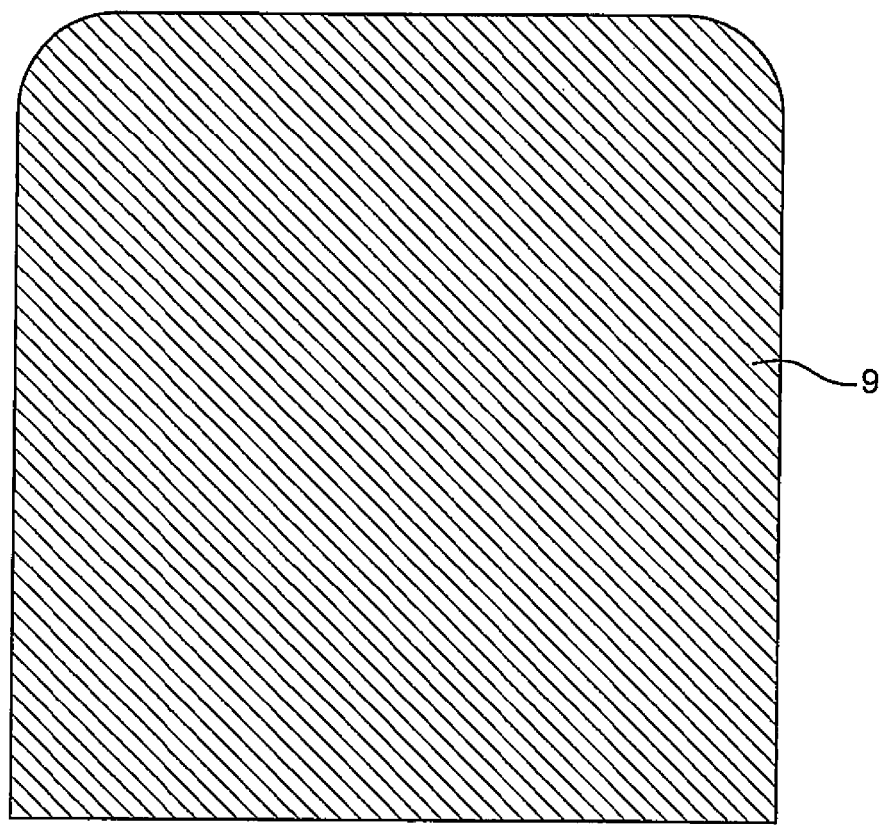
FIG. 3D is a front view of the solid-state battery of FIG. 3B.

As illustrated in FIGS. 3A, 3B, 3C, and 3D, the lower surface electrodes 61' and 62' have not only lower surface portions 61a and 62a having a plate shape disposed on the lower surface 10x side of the solid-state battery main portion 10 in a sectional view, but also extending portions 61b and 62b electrically connected to the lower surface portions 61a and 62a and extending on the surfaces of the end surface electrodes 51 and 52. The lower surface electrodes 61' and 62' having such a sectional view shape may also be referred to as "L-shaped lower surface electrodes". FIG. 3A is a sectional view schematically illustrating a structure of a solid-state battery according to the third embodiment of the present invention. FIG. 3B is a sectional view schematically illustrating a structure of the solid-state battery in a case where the solid-state battery of FIG. 3A has a coating layer. FIG. 3C is a bottom view of the solid-state battery of FIG. 3B. FIG. 3D is a front view of the solid-state battery of FIG. 3B.

The L-shaped lower surface electrodes 61' and 62' may be formed by a dry plating method or a coating/sintering method using a conductive paste, similarly to the lower surface electrodes 61 and 62 of the first embodiment, but an L-shaped electrode member manufactured in advance as a separating member may be used. The L-shaped electrode member can be manufactured by bending a metal sheet. As the L-shaped electrode member, for example, a commercially available L-shaped electrode member of a semiconductor and a capacitor can be used.

In the solid-state battery of the present embodiment, particularly when the L-shaped electrode member is used, the following effects are obtained in addition to the effects obtained in the solid-state battery of the first embodiment.

The use of the L-shaped electrode member facilitates alignment between the end surface electrode and the lower surface electrode. By using the L-shaped electrode member, it is possible to cover the surface of the end surface electrode in which the infiltration of moisture and gas is remarkable, and to further reduce the risk of the infiltration of moisture and gas. An effect of being able to withstand expansion and shrinkage relaxation of the cell at the time of charging and discharging and bending after mounting a printed circuit board is obtained.

The solid-state battery of the present embodiment can be manufactured by the same method as the solid-state battery of the first embodiment except that a step of bonding L-shaped electrode members 61' and 62' as the lower surface electrodes 61 and 62 is performed instead of the step of forming the lower surface electrodes 61 and 62.

In the step of bonding the L-shaped electrode members 61' and 62', specifically, the solid-state battery main portion 10 on which the end surface electrodes 51 and 52 are formed is bonded onto the L-shaped electrode members 61' and 62'. As a result, the L-shaped electrode members 61' and 62' (particularly, lower surface portions 61a and 62a) as the lower surface electrodes are formed on the lower surface side of the solid-state battery main portion 10. Bonding of the L-shaped electrode members to the end surface electrodes 51 and 52 and/or the solid-state battery main portion 10 can be achieved by sintering in a state where a metal paste containing metal particles of gold, silver, copper, platinum, tin, palladium, aluminum, titanium, nickel, SUS or the like is interposed therebetween.

Fourth Embodiment

The solid-state battery of the present embodiment is the same as the solid-state battery of the first embodiment except that it has the following features.

Figure 4A:
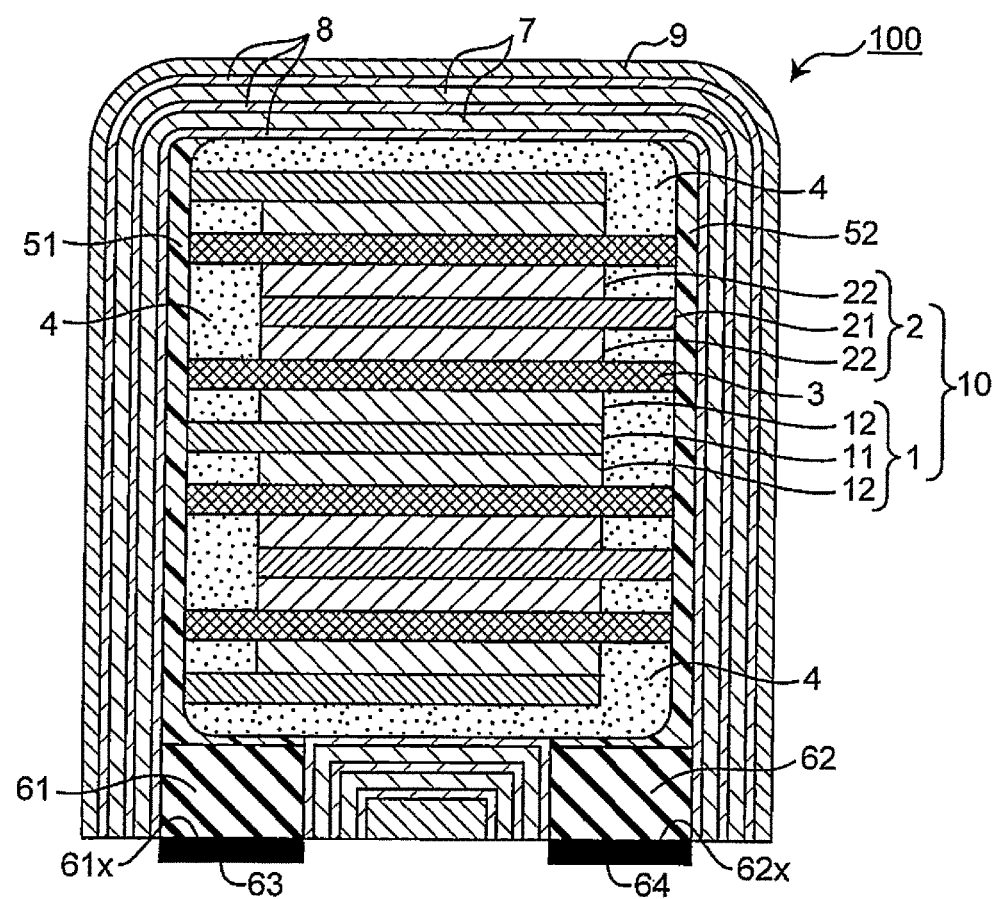
FIG. 4A is a sectional view schematically illustrating a structure of a solid-state battery according to a fourth embodiment of the present invention.
Figure 4B:
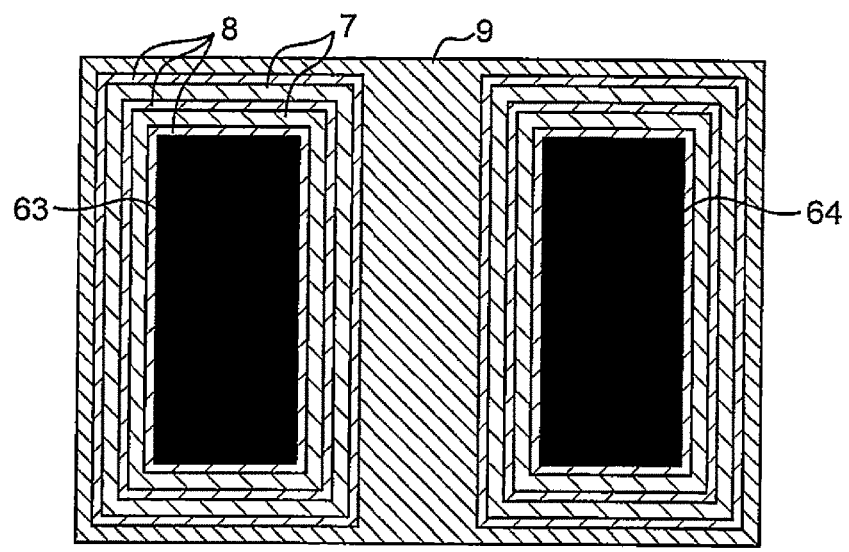
FIG. 4B is a bottom view of the solid-state battery of FIG. 4A.
Figure 4C:
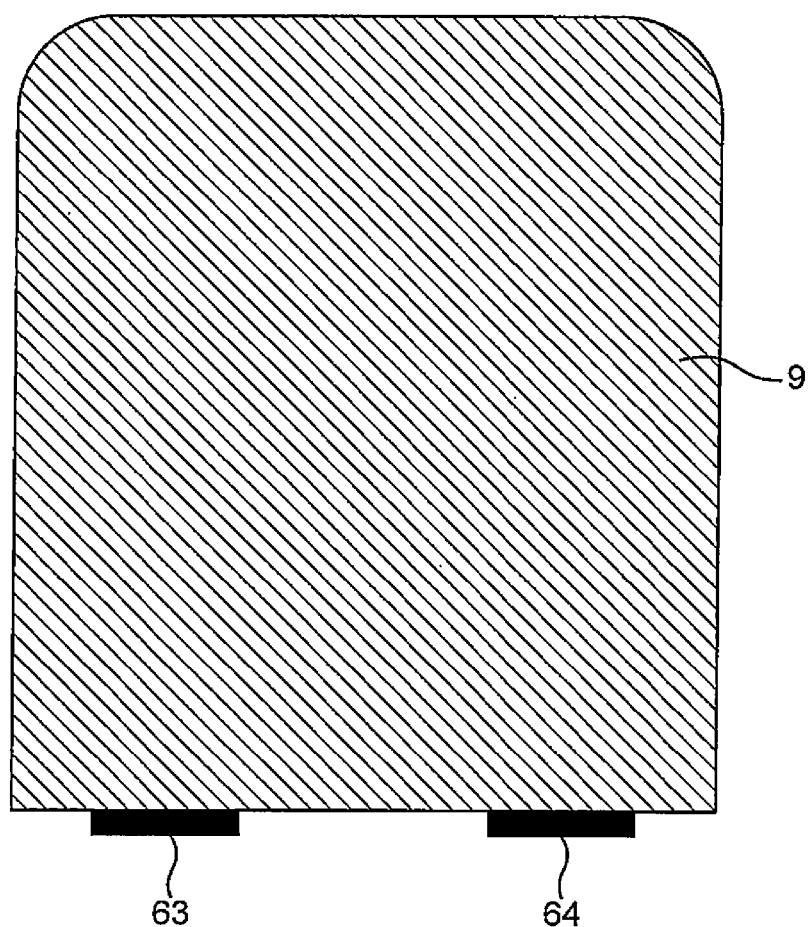
FIG. 4C is a front view of the solid-state battery of FIG. 4A.

As illustrated in FIGS. 4A, 4B, and 4C, the lower surface electrodes 61 and 62 have metal films 63 and 64 on bottom surfaces 61x and 62x of the lower surface electrodes 61 and 62, respectively. FIG. 4A is a sectional view schematically illustrating a structure of a solid-state battery according to the fourth embodiment of the present invention. FIG. 4B is a bottom view of the solid-state battery of FIG. 4A. FIG. 4C is a front view of the solid-state battery of FIG. 4A.

The metal films 63 and 64 preferably contain a material having high conductivity. A specific material of the metal film is not particularly limited, and from the viewpoint of the conductivity, a material similar to the conductive metal exemplified as the specific material of the end surface electrode can be exemplified.

The thicknesses of the metal films 63 and 64 are not particularly limited, and may be, for example, 0.01 µm to 1 µm, and particularly 1 µm to 500 µm.

In the solid-state battery of the present embodiment, the following effects are obtained in addition to the effects obtained in the solid-state battery of the first embodiment.

Since the solder wettability of the bottom surfaces 61x and 62x of the lower surface electrodes 61 and 62 is improved, the mountability of the solid-state battery is further improved.

In addition, when the center is higher than the mounting surface by the thickness of the coating layer and charge expansion of the solid-state battery occurs, the pressed impact resistant layer can push the mounting substrate to suppress mounting failure.

The solid-state battery of the present embodiment can be manufactured by forming the metal films 63 and 64 on the bottom surfaces 61x and 62x of the lower surface electrodes 61 and 62 in the solid-state battery of the first embodiment.

In the step of forming the metal films 63 and 64, specifically, the metal films 63 and 64 may be formed by a dry plating method or a coating/sintering method using a conductive paste, similarly to the lower surface electrodes 61 and 62 of the first embodiment. The metal film can be formed using a mask in the above method. For example, the metal film can be formed in a portion other than the portion hidden by the mask using an ion beam sputtering apparatus.

Fifth Embodiment

The solid-state battery of the present embodiment is the same as the solid-state battery of the first embodiment except that it has the following features.

Figure 5A:
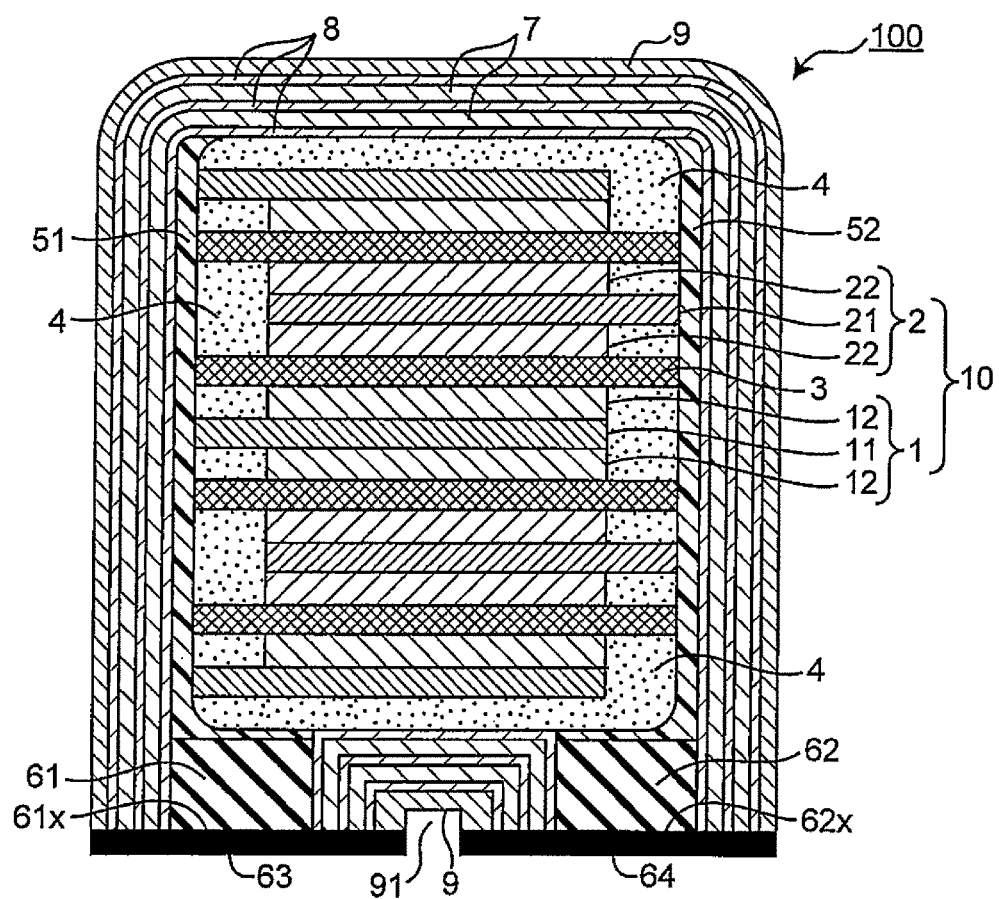
FIG. 5A is a sectional view schematically illustrating a structure of a solid-state battery according to a fifth embodiment of the present invention.
Figure 5B:
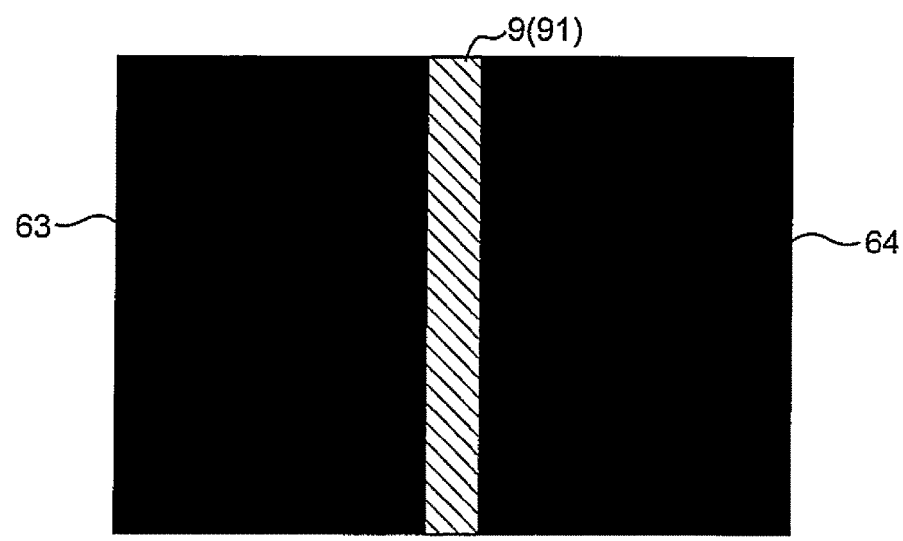
FIG. 5B is a bottom view of the solid-state battery of FIG. 5A.
Figure 5C:
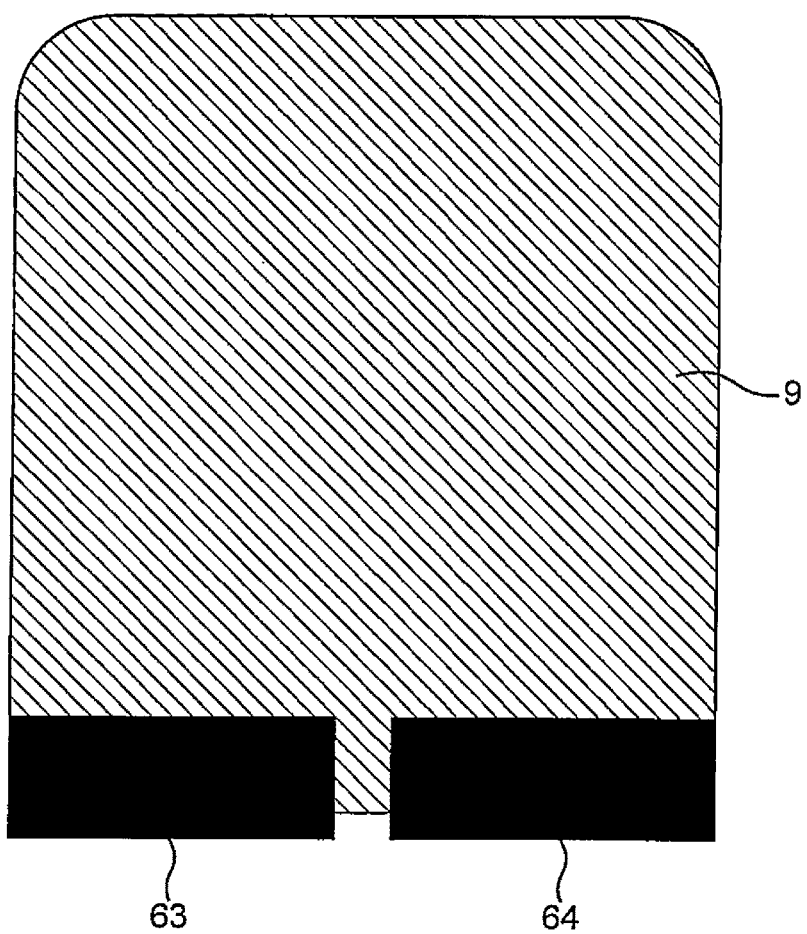
FIG. 5C is a front view of the solid-state battery of FIG. 5A.

As illustrated in FIGS. 5A, 5B, and 5C, the lower surface electrodes 61 and 62 include the metal films 63 and 64 on the bottom surfaces 61x and 62x of the lower surface electrodes 61 and 62, respectively, and the metal films 63 and 64 coat not only the bottom surfaces 61x and 62x of the lower surface electrodes 61 and 62 but also the exposed end surface (for example, P in FIG. 1E) of the each layer (in particular, the buffer layer 8) constituting the coating layer. As described in the first embodiment, the exposed end surface (for example, P in FIG. 1E) of the each layer constituting the coating layer is usually disposed on side surfaces 61y and 62y (refer to FIG. 1A) of the lower surface electrodes 61 and 62 (particularly, near the bottom surface or at the lower end portion thereof). FIG. 5A is a sectional view schematically illustrating a structure of a solid-state battery according to a fifth embodiment of the present invention. FIG. 5B is a bottom view of the solid-state battery of FIG. 5A. FIG. 5C is a front view of the solid-state battery of FIG. 5A.

The metal films 63 and 64 are similar to the metal films 63 and 64 of the fourth embodiment, and preferably contain a material having a high conductivity. A specific material of the metal film is not particularly limited, and from the viewpoint of the conductivity, a material similar to the conductive metal exemplified as the specific material of the end surface electrode can be exemplified. In general, electrical connection between the two metal films 63 and 64 is avoided from the viewpoint of preventing a short circuit.

The thicknesses of the metal films 63 and 64 are not particularly limited, and may be, for example, 0.01 µm to 1 µm, and particularly 1 µm to 500 µm.

In the solid-state battery of the present embodiment, the following effects are obtained in addition to the effects obtained in the solid-state battery of the first embodiment.

Since the solder wettability of the bottom surfaces 61x and 62x of the lower surface electrodes 61 and 62 is improved, the mountability of the solid-state battery is further improved.

Since the exposed end surface (for example, P in FIG. 1E) of the each layer (in particular, the buffer layer 8) constituting the coating layer is coated with the metal films 63 and 64, it is possible to more sufficiently prevent infiltration of a gas such as water vapor.

In addition, when the center is higher than the mounting surface by the thickness of the coating layer and charge expansion of the solid-state battery occurs, the pressed impact resistant layer can push the mounting substrate to suppress mounting failure.

In FIGS. 5A and 5B, the solid-state battery has a spot facing 91 between the two metal films 63 and 64, but may not have the spot facing. The solid-state battery preferably has a spot facing 91 between the two metal films 63 and 64. Since the solid-state battery has the spot facing 91 between the two metal films 63 and 64, it is possible to reliably prevent a short circuit between the metal films 63 and 64 at the time of mounting. The spot facing is a dug portion.

In FIG. 5C, the solid-state battery also has the metal films 63 and 64 on the side surface (particularly, the end portion thereof) thereof continuously from the bottom surface thereof, but may not have the metal films 63 and 64 on the side surface. It is preferable that the solid-state battery also has the metal films 63 and 64 on a side surface thereof (particularly, an end portion thereof) continuously from a bottom surface thereof. Since the solid-state battery also has the metal films 63 and 64 on the side surface (in particular, the end portion thereof) thereof continuously from the bottom surface thereof, it is possible to widen the range of selection of the wiring (in particular, the wiring circuit) at the time of mounting.

The solid-state battery of the present embodiment can be manufactured by forming the metal films 63 and 64 on the bottom surfaces 61x and 62x of the lower surface electrodes 61 and 62 and the exposed end surface (for example, P in FIG. 1E) of the each layer constituting the coating layer and, if desired, the side surfaces of the solid-state battery (particularly, the end portions thereof) in the solid-state battery of the first embodiment.

In the step of forming the metal films 63 and 64, specifically, the metal films 63 and 64 may be formed by a dry plating method or a coating/sintering method using a conductive paste, similarly to the lower surface electrodes 61 and 62 of the first embodiment. The metal film can be formed using a mask in the above method. For example, the metal film can be formed in a portion other than the portion hidden by the mask using an ion beam sputtering apparatus.

Sixth Embodiment

The solid-state battery of the present embodiment is the same as the solid-state battery of the first embodiment except that it has the following features.

Figure 6:
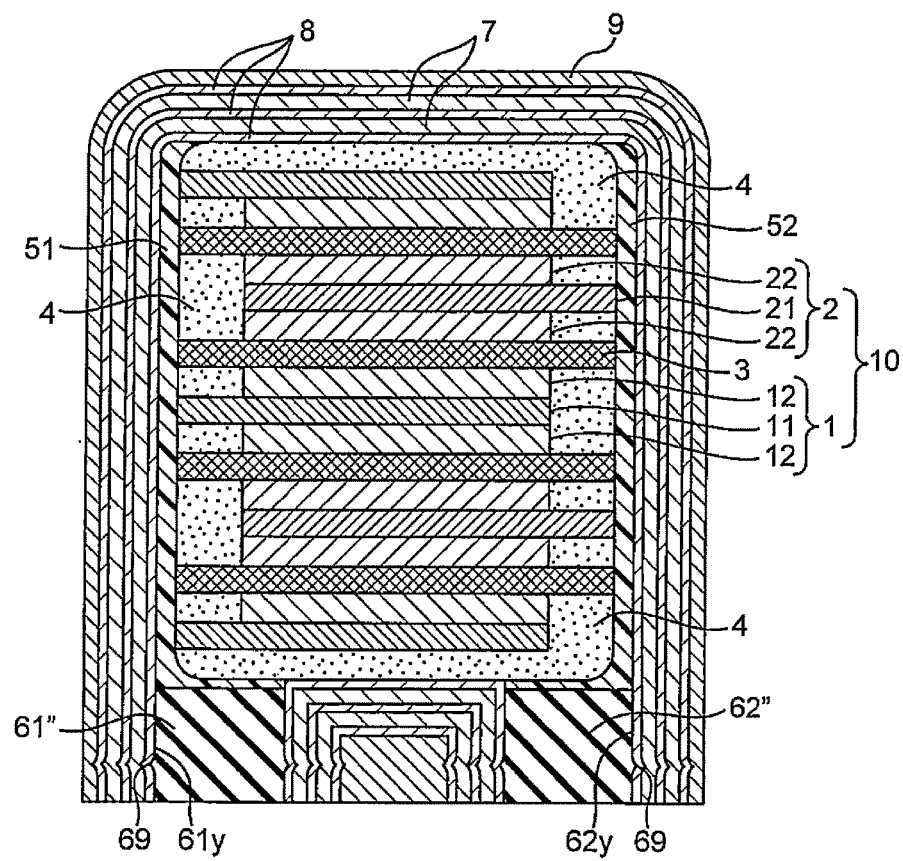
FIG. 6 is a sectional view schematically illustrating a structure of a solid-state battery according to a sixth embodiment of the present invention.

As illustrated in FIG. 6, the lower surface electrodes 61" and 62" have uneven portions 69 on the side surfaces 61y and 62y in the sectional view. FIG. 6 is a sectional view schematically illustrating a structure of a solid-state battery according to a sixth embodiment of the present invention.

The lower surface electrodes 61" and 62" may be formed by a dry plating method or a coating/sintering method using a conductive paste, similarly to the lower surface electrodes 61 and 62 of the first embodiment, but a lead frame or an L-shaped electrode member manufactured in advance as a separating member may be used. The lead frame usable in the present embodiment is similar to the lead frame of the second embodiment except that the uneven portion 69 is provided on the side surface. The L-shaped electrode member usable in the present embodiment is similar to the L-shaped electrode member of the third embodiment except that the uneven portion 69 is provided on the side surface.

In the solid-state battery of the present embodiment, since the lower surface electrodes 61" and 62" have the uneven portions 69 on the side surfaces 61y and 62y in the sectional view, the following effects are obtained together with the effects obtained in the solid-state battery of the first embodiment.

An anchor effect can be imparted to the coating layer (in particular, the impact resistant layer 9), and peeling of the lower surface electrode from the impact resistant layer or peeling of the impact resistant layer from the side surface of the lower surface electrode due to expansion and contraction during charging and discharging of the solid-state battery is prevented.

In FIG. 6, the uneven portion 69 includes only the convex portion, but is not limited thereto, and may include only the concave portion or may include a composite portion of the concave portion and the convex portion.

The solid-state battery of the present embodiment can be manufactured by the same method as the solid-state battery of the first embodiment except that the uneven portion 69 is further provided (or formed) at the time of forming the lower surface electrode.

For example, among the solid-state batteries of the present embodiment, in particular, the solid-state battery including the lead frame as the lower surface electrode can be manufactured by the same method as the solid-state battery of the second embodiment except that the lead frame including the uneven portion 69 on the side surface is used in the step of bonding a lead frame. In this case, the effect obtained in the solid-state battery of the second embodiment can also be obtained. As the lead frame including the uneven portion 69 on the side surface, for example, a lead frame including the uneven portion 69 among those commercially available as a lead frame of a semiconductor and a capacitor can be used.

Further, for example, among the solid-state batteries of the present embodiment, in particular, the solid-state battery including the L-shaped electrode member as the lower surface electrode can be manufactured by the same method as the solid-state battery of the third embodiment except that the L-shaped electrode member including the uneven portion 69 on the side surface is used in the step of bonding the L-shaped electrode member. In this case, the effect obtained in the solid-state battery of the third embodiment can also be obtained. As the L-shaped electrode member including the uneven portion 69 on the side surface, for example, among those commercially available as L-shaped electrode members of semiconductors and capacitors, the L-shaped electrode member including the uneven portion 69 can be used.

Seventh Embodiment

The solid-state battery of the present embodiment is the same as the solid-state battery of the first embodiment except that it has the following features.

Figure 7A:
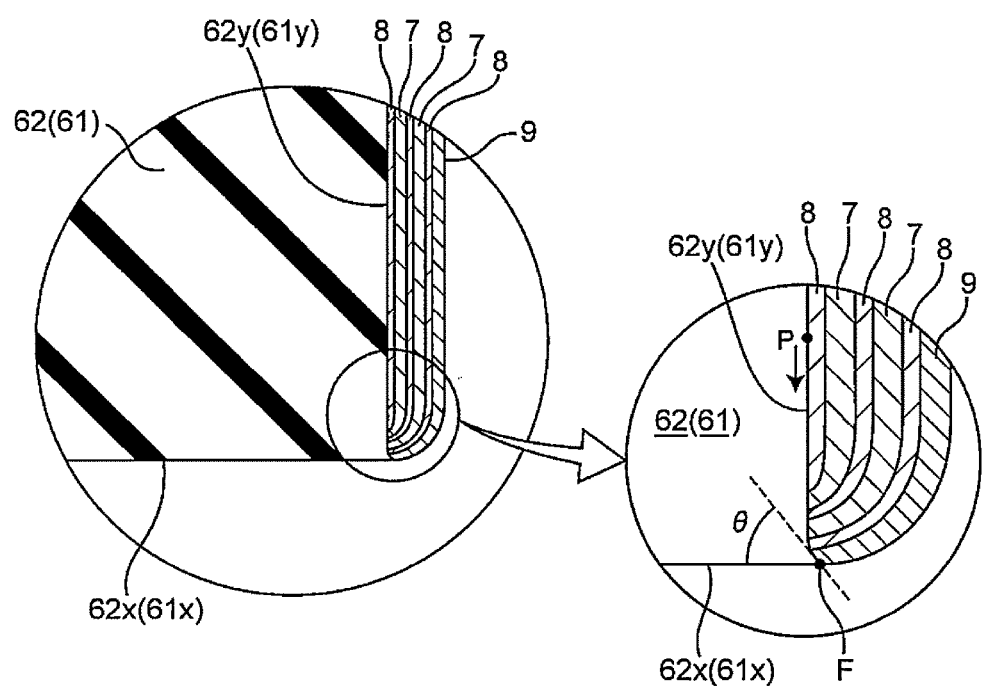
FIG. 7A is a partial enlarged sectional view of a side surface of a lower surface electrode illustrating a state in which a thickness of each layer (particularly a buffer layer) constituting a coating layer gradually decreases toward a lower end portion of the side surface of the lower surface electrode in a sectional view in a solid-state battery according to a seventh embodiment of the present invention.

As illustrated in FIG. 7A, the thickness of each layer constituting the coating layer (particularly at least one buffer layer 8) (preferably at least two buffer layers 8 and more preferably all buffer layers 8) gradually decreases toward the lower end portions (in particular, the vicinity of the bottom surfaces 61x and 62x thereof) of the side surfaces 61y and 62y of the lower surface electrodes 61 and 62 in the sectional view. FIG. 7A is a partial enlarged sectional view of a side surface of a lower electrode illustrating a state in which a thickness of each layer (particularly a buffer layer) constituting a coating layer gradually decreases toward a lower end portion of the side surface of the lower surface electrode in a sectional view in a solid-state battery according to a seventh embodiment of the present invention.

Preferably, as illustrated in FIG. 7A, each layer constituting the coating layer (particularly at least one buffer layer 8) (preferably at least two buffer layers 8 and more preferably all buffer layers 8) gradually decreases toward the lower end portions is bonded to the side surface at the lower end portions of the side surfaces 61y and 62y of the lower surface electrodes 61 and 62 in the sectional view without exposing the end surfaces.

In the solid-state battery of the present embodiment, the thickness of each layer (in particular, at least one buffer layer 8) constituting the coating layer gradually decreases toward the lower end portions of the side surfaces 61y and 62y of the lower surface electrodes 61 and 62 in the sectional view, whereby the following effects are obtained together with the effects obtained in the solid-state battery of the first embodiment.

Permeation of a gas such as water vapor is sufficiently prevented. For example, the buffer layer that easily permeates moisture and gas can be made as thin as possible at the lower end portions of the side surfaces 61y and 62y, and as a result, permeation of gas such as water vapor is sufficiently prevented. Specifically, as the buffer layer 8 becomes thinner toward the lower end of the lower surface electrode, the area of the buffer layer sandwiched between the barrier layers, that is, the area of the surface of the buffer layer in direct contact with the lower end portion of the lower surface electrode is narrowed. Therefore, the water vapor permeability is suppressed by narrowing the gas permeation area. Although there is a concern that the barrier layer is also thin, there is no influence because a sufficient water resistance effect is obtained even if the barrier layer is thin.

Figure 7B:
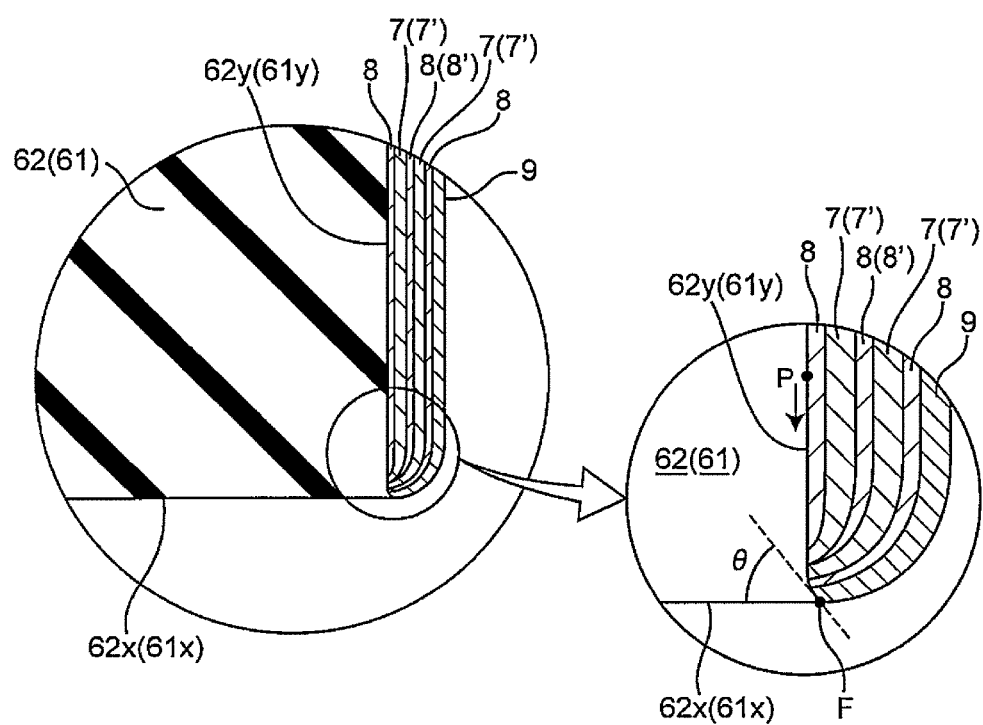
FIG. 7B is a partial enlarged sectional view of a side surface of the lower surface electrode illustrating a state in which two barrier layers sandwiching the buffer layer have a mutual bonding structure at the lower end portion of a lower surface electrode 62 (61) in the solid-state battery according to the preferred embodiment of the seventh embodiment of the present invention.

Furthermore, with respect to the two barrier layers 7 (in particular 7') and the buffer layer 8 (in particular 8') sandwiched between the two barrier layers 7 (in particular 7'), as illustrated in FIG. 7B, it is preferable that the buffer layer 8' is eliminated at the lower end portion of the lower surface electrode 62 (61), and not only the lower end portion of the lower surface electrode and the barrier layer are bonded to each other, but also the barrier layers are bonded to each other. In such a preferred aspect, it can also be expressed that the two barrier layers 7 (in particular, 7') are connected to each other at a terminal end. At the lower end portion of the lower surface electrode 62 (61), due to the mutual bonding structure of the two barrier layers 7 (particularly 7') sandwiching the buffer layer 8 (particularly 8'), there is no surface of the buffer layer 8 (particularly 8') in direct contact with the lower end portion of the lower surface electrode, and gas permeation can be reliably suppressed. The solid-state batteries of the first to sixth embodiments also preferably have a mutual bonding structure of two barrier layers 7 (particularly 7') sandwiching the buffer layer 8 (particularly 8') at the lower end portion of the lower surface electrode 62 (61). FIG. 7B is a partial enlarged sectional view of a side surface of the lower surface electrode illustrating a state in which two barrier layers sandwiching the buffer layer have a mutual bonding structure at the lower end portion of a lower surface electrode 62 (61) in the solid-state battery according to the preferred embodiment of the seventh embodiment of the present invention.

In the present embodiment, it is preferable that the end surface of at least one barrier layer 7 (preferably at least two barrier layers 7, more preferably all barrier layers 7) of the coating layers is bonded to the side surfaces at the lower end portions of the side surfaces 61y and 62y of the lower surface electrodes 61 and 62, in a sectional view. This is because a gap between the barrier layer 7 and the side surfaces 61y and 62y is eliminated to further sufficiently prevent permeation of a gas such as water vapor by the barrier layer 7.

The solid-state battery of the present embodiment can be manufactured by the same method as that used for the solid-state battery of the first embodiment except that a lower surface electrode whose side surface has an inclination angle within a specific range is used, and any layer constituting the coating layer is formed by a coating method.

In the lower surface electrodes 61 and 62 used in the present embodiment, the side surfaces 61y and 62y are lower surface electrodes having an inclination angle θ of 90° or less, preferably less than 90° at the lower end portion thereof in a sectional view. The lower limit value of the inclination angle θ is usually 80°, particularly 85°, and for example, the inclination angle θ is 80° to 90°, preferably 80° or more and less than 90°, and more preferably 85° or more and less than 90°. By setting the inclination angle C within the above range, the surface energy of the edge portion (in particular, the lower end portions of the side surfaces 61y and 62y) can be increased. By forming the coating layer on the side surface of such a lower surface electrode by a coating method, the coating layer can be significantly and appropriately thinned, and as a result, a structure in which the thickness of each layer (particularly, buffer layer) is gradually reduced can be obtained.

The inclination angle θ at the lower end portions of the side surfaces 61y and 62y of the lower surface electrodes 61 and 62 is, for example, as illustrated in FIG. 7A, an angle of a tangent of an optional point P on the side surfaces 61y and 62y with respect to the bottom surfaces 61x and 62x in a sectional view is an angle when the point P is brought close to a boundary F between the side surfaces 61y and 62y and the bottom surfaces 61x and 62x without limitation.

In the present embodiment, a lead frame or an L-shaped electrode member in which the inclination angle θ of the side surface is within the above range can be used. In the lead frame and the L-shaped electrode member, the inclination angle θ can be easily controlled by polishing or the like.

For example, among the solid-state batteries of the present embodiment, in particular, the solid-state battery including the lead frame as the lower surface electrode can be manufactured by the same method as the solid-state battery of the second embodiment except that the lead frame in which the inclination angle θ of the side surface is within the above range is used in the step of bonding a lead frame. In this case, the effect obtained in the solid-state battery of the second embodiment can also be obtained.

Further, for example, among the solid-state batteries of the present embodiment, in particular, the solid-state battery including the L-shaped electrode member as the lower surface electrode can be manufactured by the same method as the solid-state battery of the third embodiment except that the L-shaped electrode member in which the inclination angle θ of the side surface is within the above range is used in the step of bonding the L-shaped electrode member. In this case, the effect obtained in the solid-state battery of the third embodiment can also be obtained.

In the present embodiment, as described in the fourth embodiment, since the lower surface electrodes 61 and 62 have the metal films 63 and 64 on the bottom surfaces 61x and 62x of the lower surface electrodes 61 and 62, it is possible to obtain an effect that the solder wettability of the bottom surfaces 61x and 62x is improved and the mountability of the solid-state battery is further improved.

Although the embodiments of the present invention have been described above, only typical examples have been illustrated. Those skilled in the art will easily understand that the present invention is not limited thereto, and various aspects are conceivable without changing the gist of the present invention.

The solid-state battery of the present invention can be used in various fields where battery use and electric storage are assumed. By way of example only, the solid-state battery of the present invention can be used in the field of electronics mounting. In addition, the solid-state battery of the present invention can be used in the fields of electricity, information, and communication in which mobile equipment, and the like are used (for example, electric and electronic equipment fields or mobile equipment fields including mobile phones, smartphones, notebook computers and digital cameras, activity meters, arm computers, electronic papers, and small electronic machines such as wearable devices, RFID tags, card type electronic money, and smartwatches), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a research submarine), and the like.

DESCRIPTION OF REFERENCE SYMBOLS

1: Negative electrode layer
2: Positive electrode layer
3: Solid electrolyte layer
4: Insulating layer
7: Barrier layer
8: Buffer layer
9: Impact resistant layer
10: Solid-state battery main portion
10x: Lower surface of solid-state battery main portion
10y: Upper surface of solid-state battery main portion
11: Negative electrode current collecting layer
12: Negative electrode active material layer
21: Positive electrode current collecting layer
22: Positive electrode active material layer
51, 52: End surface electrode
51a, 52a: Lower surface coating portion of end surface electrode
61, 62: Lower surface electrode
61', 62': L-shaped electrode member as lower surface electrode
61", 62": Lower surface electrode including uneven portion
61a, 62a: Lower surface portion of lower surface electrode
61b, 62b: Extending portion of lower surface electrode
61x, 62x: Bottom surface of lower surface electrode
61y, 62y: Side surface of lower surface electrode
63, 64: Metal film
65, 66: Lead frame
67: Frame for lead frame
68: Connection portion of lead frame
69: Uneven portion
100: Solid-state battery
600: Lead frame sheet

The invention claimed is:

1. A solid-state battery comprising:
a solid-state battery main portion having a positive electrode layer and a negative electrode layer alternatively stacked with a solid electrolyte layer interposed therebetween;
a first end surface electrode electrically connected to the positive electrode layer and disposed on a first side surface of the solid-state battery main portion, the first end surface electrode including a first lower surface coating portion coating a first end portion of a lower surface side of the solid-state battery main portion;

a second end surface electrode electrically connected to the negative electrode layer and disposed on a second side surface of the solid-state battery main portion, the second end surface electrode including a second lower surface coating portion coating a second end portion of the lower surface side of the solid-state battery main portion;

a first lower surface electrode electrically connected to the first lower surface coating portion of the first end surface electrode and disposed on the lower surface side of the solid-state battery main portion;

a second lower surface electrode electrically connected to the second lower surface coating portion of the second end surface electrode and disposed on the lower surface side of the solid-state battery main portion; and a coating layer on all exterior surfaces of the solid-state battery except for a bottom surface of the first and second lower surface electrodes, the coating layer including at least one barrier layer.

2. The solid-state battery according to claim 1, wherein the first lower surface electrode is in surface contact with the first end surface electrode, and the second lower surface electrode is in surface contact with the second end surface electrode.

3. The solid-state battery according to claim 1, wherein the at least one barrier layer has a water vapor permeation rate of $1.0 \times 10^{-2}$ g/(m²·Day) or less.

4. The solid-state battery according to claim 1, wherein the coating layer further includes one or more layers selected from a buffer layer or an impact resistant layer.

5. The solid-state battery according to claim 1, wherein the coating layer further includes an interface layer as an innermost layer of the coating layer.

6. The solid-state battery according to claim 1, wherein the coating layer further includes an impact resistant layer as an outermost layer of the coating layer.

7. The solid-state battery according to claim 1, wherein the coating layer further includes a buffer layer, and the buffer layer is adjacent to the barrier layer.

8. The solid-state battery according to claim 1, wherein each layer of the coating layer has an exposed end surface on a side surface of the first and second lower surface electrodes in a sectional view of the solid-state battery.

9. The solid-state battery according to claim 8, further comprising:

a first metal film on a bottom surface of the first lower surface electrode; and a second metal film on a bottom surface of the second lower surface electrode.

10. The solid-state battery according to claim 9, wherein the first metal film and the second metal film cover the exposed end surface of each layer of the coating layer.

11. The solid-state battery according to claim 7, wherein the buffer layer has a thickness that gradually decreases toward a lower end portion of a side surface of the first and second lower surface electrodes in a sectional view of the solid-state battery.

12. The solid-state battery according to claim 11, wherein the side surface of the first and second lower surface electrodes has an inclination angle θ of less than 90° at a lower end portion thereof in the sectional view.

13. The solid-state battery according to claim 11, further comprising:

a first metal film on a bottom surface of the first lower surface electrode; and a second metal film on a bottom surface of the second lower surface electrode.

14. The solid-state battery according to claim 1, wherein (1) the first lower surface electrode includes only a first lower surface portion having a plate shape on a lower surface side of the solid-state battery main portion in a sectional view of the solid state battery, or includes the first lower surface portion and a first extending portion electrically connected to the first lower surface portion and extending to a surface of the first end surface electrode; and (2) the second lower surface electrode includes only a second lower surface portion having a plate shape on a lower surface side of the solid-state battery main portion in the sectional view, or includes the second lower surface portion and a second extending portion electrically connected to the second lower surface portion and extending to a surface of the second end surface electrode.

15. The solid-state battery according to claim 1, wherein the first and second lower surface electrodes are part of a lead frame.

16. The solid-state battery according to claim 1, wherein the first and second lower surface electrodes have an uneven portion on respective side surfaces thereof in a sectional view of the solid-state battery.

17. The solid-state battery according to claim 1, wherein the solid-state battery main portion has a curved surface shape at an edge portion thereof.

18. The solid-state battery according to claim 1, wherein the solid-state battery main portion is formed of a sintered body.

19. The solid-state battery according to claim 1, wherein the positive electrode layer and the negative electrode layer are layers capable of occluding and releasing a lithium ion.

\* \* \* \* \*